(12) United States Patent
Chung et al.

(10) Patent No.: US 10,949,546 B2
(45) Date of Patent: Mar. 16, 2021

(54) SECURITY DEVICES, ELECTRONIC DEVICES AND METHODS OF OPERATING ELECTRONIC DEVICES

(71) Applicant: Samsung Electronics Co., Ltd., Suwon-si (KR)

(72) Inventors: Young-Jin Chung, Seongnam-si (KR); Jae-Chul Park, Seoul (KR); Ki-Seok Bae, Yongin-si (KR); Jong-Hoon Shin, Hwaseong-si (KR); Yun-Ho Youm, Seoul (KR); Hye-Soo Lee, Yongin-si (KR); Hong-Mook Choi, Bucheon-si (KR); Jin-Su Hyun, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 210 days.

(21) Appl. No.: 16/023,401

(22) Filed: Jun. 29, 2018

(65) Prior Publication Data
US 2019/0042765 A1 Feb. 7, 2019

(30) Foreign Application Priority Data

Aug. 2, 2017 (KR) .................. 10-2017-0098249
Nov. 15, 2017 (KR) .................. 10-2017-0151967

(51) Int. Cl.
*G06F 21/60* (2013.01)
*G06F 21/78* (2013.01)
(Continued)

(52) U.S. Cl.
CPC .......... *G06F 21/602* (2013.01); *G06F 21/572* (2013.01); *G06F 21/575* (2013.01);
(Continued)

(58) Field of Classification Search
CPC .... G06F 21/602; G06F 21/572; G06F 21/575; G06F 21/78; G06F 21/85;
(Continued)

(56) References Cited

U.S. PATENT DOCUMENTS 5,613,162 A * 3/1997 Kabenjian ............... G06F 13/28
710/22
6,807,602 B1 * 10/2004 Hornung ............. G06F 12/0607
711/164

(Continued)

FOREIGN PATENT DOCUMENTS

KR 10-1609095 B1 4/2016
KR 20160109891 A 9/2016

OTHER PUBLICATIONS

John Goodwin, et al., Power analysis detectable watermarks for protecting intellectual property, May 30-Jun. 2, 2010, Proceedings of 2010 IEEE International Symposium on Circuits and Systems), pp. 2342-2345.*

(Continued)

*Primary Examiner* — Jeffery L Williams
*Assistant Examiner* — Raied A Salman
(74) *Attorney, Agent, or Firm* — Harness, Dickey & Pierce, P.L.C.

(57) ABSTRACT

A security device includes a secure processor, a mail box, a cryptographic intellectual property (IP), a secure direct memory access (DMA) circuit, and an internal memory. The secure processor provides an isolated execution environment. The mail box transfers a request from a CPU to the secure processor. The cryptographic IP performs one or more secure operations, including a signature certification operation, an encryption/decryption operation, and an integrity verification operation, on secure data within the isolated execution environment and without intervention of the CPU. The secure DMA circuit controls the one or more secure (Continued)

operations within the isolated execution environment, wherein only the secure processor is configured to control the secure DMA circuit. The internal memory stores the secure data on which the one or more secure operations are performed. The cryptographic IP includes a DMA circuit configured to control data access to an external storage.

19 Claims, 15 Drawing Sheets

(51) Int. Cl.
| | |
|---|---|
| *G06F 21/85* | (2013.01) |
| *H04L 9/06* | (2006.01) |
| *G06F 21/57* | (2013.01) |
| *H04L 9/32* | (2006.01) |
| *H04L 9/08* | (2006.01) |

(52) U.S. Cl.
CPC ............ *G06F 21/78* (2013.01); *G06F 21/85* (2013.01); *H04L 9/0618* (2013.01); *H04L 9/0643* (2013.01); *H04L 9/0894* (2013.01); *H04L 9/3247* (2013.01); *G06F 2221/2149* (2013.01); *H04L 2209/122* (2013.01)

(58) Field of Classification Search
CPC ............ G06F 2221/2149; G06F 13/28; G06F 12/1408; H04L 9/0618; H04L 9/0643; H04L 9/0894; H04L 9/3247; H04L 2209/122
See application file for complete search history.

(56) References Cited

U.S. PATENT DOCUMENTS

| | | | | |
|---|---|---|---|---|
| 7,631,190 | B2* | 12/2009 | Walmsley | H04L 9/12 380/44 |
| 7,792,300 | B1 | 9/2010 | Caronni | |
| 8,108,641 | B2* | 1/2012 | Goss | G06F 12/0246 711/163 |
| 8,171,204 | B2* | 5/2012 | Chow | G06F 21/32 711/103 |
| 8,281,115 | B2 | 10/2012 | Choi et al. | |
| 8,312,524 | B2* | 11/2012 | Kuno | H04L 9/3273 726/9 |
| 8,365,308 | B2* | 1/2013 | Rodgers | G06F 21/81 726/34 |
| 8,543,838 | B1* | 9/2013 | Au | G06F 21/602 713/190 |
| 8,782,433 | B2* | 7/2014 | Kaabouch | G06F 12/1408 713/190 |
| 8,794,535 | B2* | 8/2014 | Marseille | G06K 19/07345 235/492 |
| 9,094,190 | B2 | 7/2015 | Park et al. | |
| 9,251,347 | B2* | 2/2016 | Bulusu | G06F 9/4401 |
| 9,252,960 | B2 | 2/2016 | Schrijen et al. | |
| 9,390,291 | B2* | 7/2016 | Cox | G06F 21/72 |
| 9,430,406 | B2 | 8/2016 | Van Der Sluis et al. | |
| 9,537,653 | B2 | 1/2017 | Komano et al. | |
| 9,589,117 | B2* | 3/2017 | Ali | H04L 63/062 |
| 9,667,425 | B2* | 5/2017 | Goss | H04L 63/18 |
| 9,712,374 | B1* | 7/2017 | Cao | H04L 29/08072 |
| 9,792,234 | B2* | 10/2017 | Mangalampalli | G06F 21/602 |
| 9,880,787 | B2* | 1/2018 | Ninos | G06F 3/0619 |
| 10,206,114 | B2* | 2/2019 | Choi | G06F 8/654 |
| 10,255,079 | B2* | 4/2019 | Jang | G06F 1/324 |
| 10,474,589 | B1* | 11/2019 | Raskin | G06F 21/604 |
| 10,498,540 | B2* | 12/2019 | Medvinsky | H04L 9/30 |
| 10,572,687 | B2* | 2/2020 | Jungwirth | G06F 21/78 |
| 2005/0283662 | A1 | 12/2005 | Li et al. | |
| 2009/0262926 | A1 | 10/2009 | Kabra et al. | |
| 2009/0285390 | A1 | 11/2009 | Scherer et al. | |
| 2010/0208540 | A1* | 8/2010 | Shiu | G11C 7/1012 365/230.03 |
| 2011/0028126 | A1* | 2/2011 | Lim | H04W 12/06 455/411 |
| 2013/0051552 | A1 | 2/2013 | Handschuh et al. | |
| 2014/0089682 | A1* | 3/2014 | Gulati | G06F 21/72 713/192 |
| 2014/0189365 | A1* | 7/2014 | Cox | H04L 9/0866 713/189 |
| 2015/0188707 | A1 | 7/2015 | Gehrer et al. | |
| 2015/0261521 | A1* | 9/2015 | Choi | G06F 8/654 713/176 |
| 2016/0125187 | A1 | 5/2016 | Oxford | |
| 2017/0004100 | A1* | 1/2017 | Mangalampalli | G06F 12/1441 |
| 2019/0114428 | A1* | 4/2019 | Kim | G06F 21/74 |
| 2019/0238342 | A1* | 8/2019 | Lian | H04L 9/321 |
| 2019/0280856 | A1* | 9/2019 | Yeap | G06Q 50/184 |

OTHER PUBLICATIONS

H. T. Kung; et al., Maestro: A Memory-on-Logic Architecture for Coordinated Parallel Use of Many Systolic Arrays, Jul. 15-17, 2019, 2019 IEEE 30th International Conference on Application-specific Systems, Architectures and Processors (ASAP), pp. 1-9.*

* cited by examiner

SECURITY DEVICES, ELECTRONIC DEVICES AND METHODS OF OPERATING ELECTRONIC DEVICES

CROSS-REFERENCE TO RELATED APPLICATIONS

This US application claims the benefit of priority under 35 U.S.C. § 119 to Korean Patent Application No. 10-2017-0098249, filed on Aug. 2, 2017, and to Korean Patent Application No. 10-2017-0151967, filed on Nov. 15, 2017, in the Korean Intellectual Property Office, the disclosures of which are incorporated by reference in their entirety herein.

BACKGROUND

The present disclosure relates to data security, and more particularly to security devices, electronic devices including the same, and methods of operating electronic devices.

Recently, an electronic device, such as a mobile device, performs various types of operations using sensitive data, such as personal information, a cryptographic key, etc.

The electronic device may operate in a low power mode, including a stand-by mode, a sleep mode, and a power-down mode, which reduces power consumption. When entering and exiting the low power mode, it is very important (and/or desirable) to back-up and to restore the sensitive data, respectively. However, known techniques for backing up and restoring sensitive data may take a considerable amount of time to perform, which may substantially reduce performance (especially for an electronic device which frequently enters and leaves the low power mode, such as a resource-constrained mobile device with limited processing and/or memory resources). In addition, such known techniques for backing up and restoring sensitive data may be inherently insecure, which may risk corruption of the sensitive data and/or compromise of the electronic device itself (especially for an electronic device which requires intervention of a central processing unit (CPU) to perform one or more secure operations). Therefore, improved techniques for performing secure back-up operations and secure restoring operations in connection with sensitive data used by an electronic device are needed (and/or desired) for providing enhanced performance, efficiency, and/or security.

SUMMARY

According to some example embodiments, a security device included in an electronic device includes a secure processor, a mail box, a cryptographic intellectual property (IP), a secure direct memory access (DMA) circuit, and an internal memory. The secure processor provides an isolated execution environment with which a central processing unit (CPU) of the electronic device does not intervene. The mail box transfers a request received from the CPU to the secure processor. The cryptographic IP is coupled to the secure processor through an internal bus, and performs one or more secure operations including a signature certification operation on secure data, an encryption/decryption operation on the secure data, and an integrity verification operation on the secure data, within the isolated execution environment. The secure DMA circuit is coupled to the internal bus, and the secure DMA circuit controls the one or more secure operations within the isolated execution environment. Only the secure processor is configured to control the secure DMA circuit. The internal memory is coupled to the internal bus, and the internal memory stores the secure data on which the one or more secure operations are performed. The cryptographic IP includes a DMA circuit configured to control data access to an external storage.

According to some example embodiments, an electronic device includes a central processing unit (CPU), a security device, and an external storage. The security device receives a request from the CPU and executes the request within an isolated execution environment with which the CPU does not intervene. The external storage is connected to the security device. The security device includes a secure processor, a mail box, a cryptographic intellectual property (IP), a secure direct memory access (DMA) circuit, and an internal memory. The secure processor provides the isolated execution environment. The mail box transfers the request received from the CPU to the secure processor. The cryptographic IP is coupled to the secure processor through an internal bus, and performs one or more secure operations including a signature certification operation on secure data, an encryption/decryption operation on the secure data, and an integrity verification operation on the secure data, within the isolated execution environment. The secure DMA circuit is coupled to the internal bus, and controls the one or more secure operations within the isolated execution environment. Only the secure processor is configured to control the secure DMA circuit. The internal memory is coupled to the internal bus, and stores the secure data on which the one or more secure operations are performed. The cryptographic IP includes a DMA circuit configured to control data access to an external storage.

According to some example embodiments, a method of operating an electronic device, the electronic device including a central processing unit (CPU) and a security device, to receive a request from the CPU and to execute the request within an isolated execution environment with which the CPU does not intervene, includes powering-on the electronic device, performing, in a cryptographic intellectual property (IP) of the security device, a signature certification operation on a firmware image to store secure data in an internal memory of the security device, determining whether the electronic device enters into a low power mode, performing, in the cryptographic IP in response to determining that the electronic device is entering into the low power mode, a secure back-up operation to encrypt the secure data using a hardware unique key of the electronic device to generate encrypted secure data, and to store the encrypted secure data in an external storage connected to the security device, within the isolated execution environment and without intervention of the CPU, and performing, in the cryptographic IP in response to receiving a wake-up request from the CPU, a secure restoring operation to decrypt the encrypted secure data stored in the external storage using the hardware unique key to generate decrypted secure data, and to store the decrypted secure data in the internal memory, within the isolated execution environment and without intervention of the CPU.

The security device according to some example embodiments may perform a secure back-up operation to encrypt secure data, including a signature-certified firmware image and/or sensitive data, to generate encrypted secure data, to perform a hash operation on the secure data to generate a first hash value, to encrypt the first hash value to generate an encrypted first hash value, and to store the encrypted secure data and the encrypted first hash value in an external nonvolatile storage, within the isolated execution environment and without intervention of the CPU. The security device according to some example embodiments may perform a secure restoring operation to decrypt the encrypted secure data and the encrypted first hash value stored in the external nonvolatile storage to generate decrypted secure data and a decrypted first hash value, to perform a hash operation on the decrypted secure data to generate a second hash value, and to perform an integrity verification operation on the decrypted secure data by comparing the decrypted first hash value and the second hash value, within the isolated execution environment and without intervention of the CPU. In this manner, the security device according to some example embodiments may safely use the secure data without requiring an additional signature certification operation to be performed (e.g., by the CPU) for warm boot, which substantially enhances performance, efficiency, and security of an electronic device including the security device.

BRIEF DESCRIPTION OF THE DRAWINGS

Some example embodiments will be described below in more detail with reference to the accompanying drawings.

DETAILED DESCRIPTION

Various example embodiments will be described more fully hereinafter with reference to the accompanying drawings, in which some example embodiments are shown.

Figure 1:
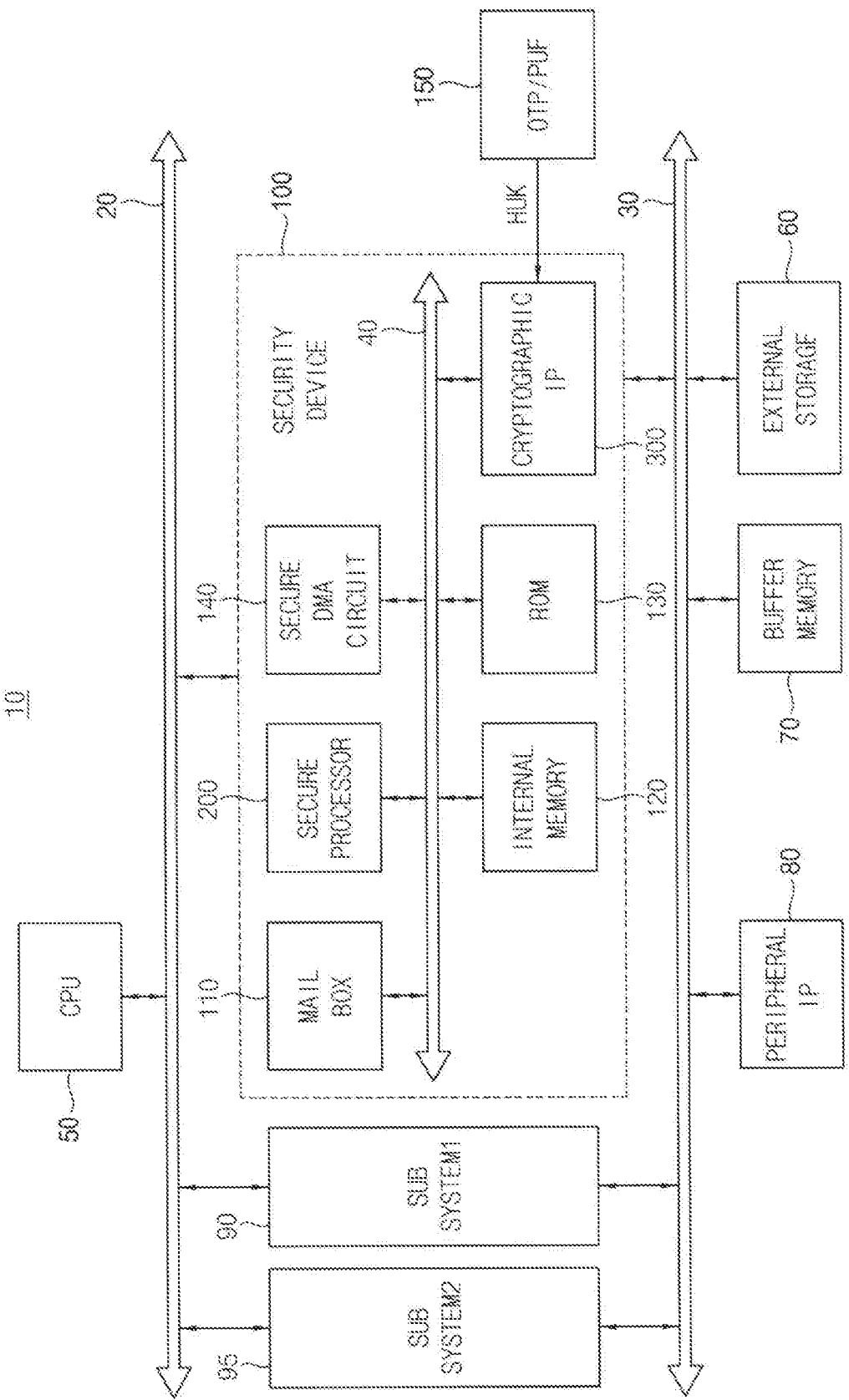
FIG. 1 is a block diagram illustrating an electronic device according to some example embodiments.

FIG. 1 is a block diagram illustrating an electronic device according to some example embodiments.

Referring to FIG. 1, an electronic device 10 includes a central processing unit (CPU) 50, a security device 100, a first sub system 90, a second sub system 95, an external storage 60, a buffer memory 70, and/or a peripheral intellectual property (IP) 80. The security device 100 may be referred to as a security sub system.

The CPU 50 may be coupled to the security device 100, the first sub system 90, and the second sub system 95 through a first system bus 20. The security device 100, the first sub system 90, and the second sub system 95 may be coupled to the external storage 60, the buffer memory 70, and the peripheral IP 80 through a second system bus 30.

The CPU 50 may control the first sub system 90 and the second sub system 95 to perform respective functions. The security device 100, the first sub system 90, and the second sub system 95 may commonly use the external storage 60, the buffer memory 70, and the peripheral IP 80.

The electronic device 10 may be coupled to the external storage 60 through the security device 100. The electronic device 10 or the security device 100 may further include an unclonable storage device 150 that has a one-time programmable (OTP) function/a physically unclonable function (PUF). The unclonable storage device 150 may store a hardware unique key (HUK) of the electronic device 10. The electronic device 10 may be a system-on-chip (SoC) or a mobile device, for example.

The CPU 50 and the security device 100 may be coupled to each other through the first system bus 20 and may communicate with each other.

The CPU 50 may process data and/or execute programs stored in the buffer memory 70 and/or the external storage 60. The CPU 50 may be implemented as a multi-core processor. The multi-core processor is a single computing component with two or more independent actual processors (referred to as cores). Each of the processors may read and execute program instructions. The multi-core processor can drive a plurality of accelerators at a time, and therefore, a data processing system including the multi-core processor may perform multi-acceleration.

The external storage 60 may include a memory controller (e.g., memory controller 61 of FIG. 2, not shown in FIG. 1) to transmit/receive data to/from the security device 100. The external storage 60 may be a nonvolatile storage such as a universal serial bus (USB) memory, a universal flash storage (UFS), and a solid state drive (SSD), for example.

As mentioned above, the security device 100 may be referred to as the security sub system.

The security device 100 may include a mail box 110, an internal memory 120, a read-only memory (ROM) 130, a secure direct memory access (DMA) circuit 140, a secure processor 200, and/or a cryptographic intellectual property (IP) 300. The mail box 110, the internal memory 120, the ROM 130, the secure DMA circuit 140, the secure processor 200, and the cryptographic IP 300 may be connected to each other through an internal bus 40. One or more of the mail box 110, the secure DMA circuit 140, the secure processor 200, and/or the cryptographic IP 300 may be implemented via various hardware components, and/or a combination of hardware and software stored in storage media, according to some example embodiments. For example, hardware may be implemented using processing circuitry such as, but not limited to, one or more processors, one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device(s) capable of being customized into special purpose processing circuitry and/or configured for responding to and executing instructions in a defined manner.

When the secure processor 200 performs a secure operation, the secure processor 200 may provide an isolated execution environment with which the CPU 50 cannot intervene. Accordingly, the secure processor 200 may perform one or more secure operations safely and independently from the CPU 50.

The mail box 110 may transfer a request received from the CPU 50 to the secure processor 200. The CPU 50 cannot intervene with the one or more secure operations of the secure processor 200 within the isolated execution environment, and may transfer the request to the secure processor 200 only through the mail box 110 within the isolated execution environment.

The ROM 130 may store code to be executed by the secure processor 200 for controlling and/or configuring one or more components of the security device 100 to perform one or more secure operations, according to some example embodiments. For example, the secure processor 200 may execute the code stored in the ROM 130 to control and/or configure the secure DMA circuit 140 (and/or components thereof) and/or the cryptographic IP 300 (and/or components thereof), as discussed in detail below. The ROM 130 may be implemented by an erasable programmable ROM (EPROM) or an electrically erasable programmable ROM (EEPROM), for example. Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above and described in further detail below. Examples of program code include both machine code produced by a compiler and higher level program code that is executed using an interpreter, according to some example embodiments.

The internal memory 120 may store sensitive data and/or firmware associated with one or more secure operations of the secure processor 200. The internal memory 120 may include a volatile memory device, such as a dynamic random access memory (DRAM) and a static random access memory (SRAM), for example.

The cryptographic IP 300 may perform one or more secure operations including a signature certification operation, an encryption/decryption operation, and an integrity verification operation, within the isolated execution environment and without intervention of the CPU 50. The cryptographic IP 300 may perform at least one of these secure operations under control of the secure processor 200 in response to the request received from the CPU 50.

The hardware unique key HUK cannot be altered by any component of the electronic device 10, including the security device 100. The hardware unique key HUK may be provided only to the cryptographic IP 300 by the unclonable storage device 150, and cannot be accessed by any other component of the electronic device 10.

The secure DMA circuit 140 may be used for performing a secure back-up operation and a secure restoring operation on secure data, including code (e.g., a firmware image) and/or sensitive data which the security device 100 uses within the isolated execution environment.

Only the secure processor 200 may access the secure DMA circuit 140 to control the secure DMA circuit 140, and may control setting configurations associated with the secure back-up operation and the secure restoring operation.

Figure 2:
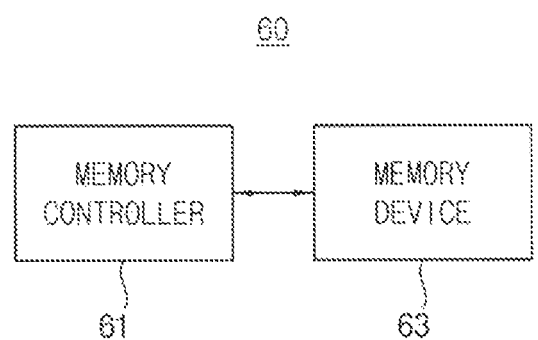
FIG. 2 is a block diagram illustrating an example of the external storage in the electronic device of FIG. 1 according to some example embodiments.

FIG. 2 is a block diagram illustrating an example of the external storage in the electronic device of FIG. 1 according to some example embodiments.

Referring to FIG. 2, the external storage 60 may include a memory controller 61 and/or a memory device 63.

Referring to FIG. 2, the memory controller 61 may be connected to a DMA circuit (e.g., DMA circuit 400 of FIGS. 4-5, not shown in FIG. 2) in the cryptographic IP 300, and may store encrypted secure data, received from the cryptographic IP 300, in the memory device 63. In addition, the memory controller 61 may provide the cryptographic IP 300 with the encrypted secure data stored in the memory device 63 through the DMA circuit (e.g., DMA circuit 400).

The memory device 63 may be a nonvolatile memory device such as NAND flash memory device, for example.

Figure 3:
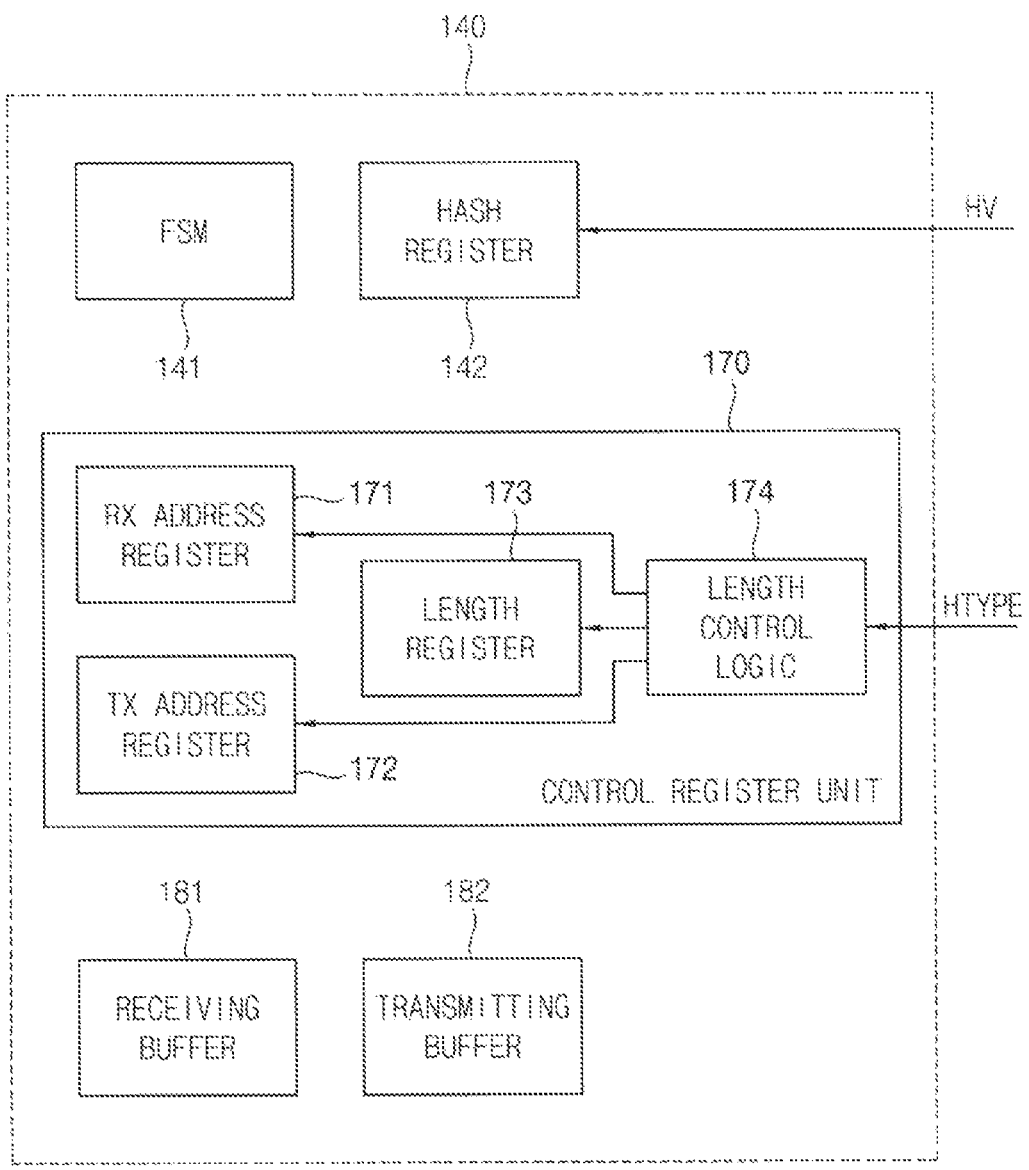
FIG. 3 is a block diagram illustrating an example of the secure DMA circuit in the security device in FIG. 1 according to some example embodiments.

FIG. 3 is a block diagram illustrating an example of the secure DMA circuit in the security device in FIG. 1 according to some example embodiments.

Referring to FIG. 3, the secure DMA circuit 140 may include a finite state machine (FSM) 141, a hash register 142, a control register unit 170, a receiving buffer 181, and/or a transmitting buffer 182. The secure DMA circuit 140 may control and/or configure one or more components thereof (e.g., including but not limited to the control register unit 170 and/or a length control logic 174, discussed below) according to the control and/or configuration set by the secure processor 200, for example. The control register unit 170 and/or components thereof (e.g., including but not limited to the length control logic 174, discussed below) may be implemented via hardware components, and/or a combination of hardware and software stored in storage media, according to some example embodiments. For example, hardware may be implemented using processing circuitry such as, but not limited to, one or more processors, controllers, ALUs, DSPs, microcomputers, FPGAs, SoCs, PLUs, microprocessors, ASICs, or any other device(s) capable of being customized into special purpose processing circuitry and/or configured for responding to and executing instructions in a defined manner.

The control register unit 170 may include a reception (RX) address register 171, a transmission (TX) address register 172, a length register 173, and/or a length control logic 174.

The length control logic 174 may receive hash type information HTYPE from the secure processor 200, and may set a configuration of the reception (RX) address register 171, the transmission (TX) address register 172, and the length register 173, respectively, according to a hash mode designated by the hash type information HTYPE.

The reception (RX) address register 171 may store a reception address according to the configuration set by the length control logic 174, the transmission (TX) address register 172 may store a transmission address according to the configuration set by the length control logic 174, and the length register 173 may store length information of data associated with the addresses stored in the reception (RX) address register 171 and the transmission (TX) address register 172 according to the configuration set by the length control logic 174, respectively.

The receiving buffer 181 may temporarily store the reception address, and the transmitting buffer 182 may temporarily store the transmission address.

The FSM 141 may designate an operation state of the security device 100, and the hash register 142 may store a hash value HV received from the cryptographic IP 300.

For example, the hash type information HTYPE may designate a hash operation corresponding to one of the following Secure Hash Algorithms: SHA-1, SHA-256, SHA-384, and SHA-512. When the cryptographic IP 300 uses SHA-1, the hash value HV may have a size of 160 bits. When the cryptographic IP 300 uses SHA-256, the hash value HV may have a size of 256 bits. When the cryptographic IP 300 uses SHA-384, the hash value HV may have a size of 384 bits. When the cryptographic IP 300 uses SHA-512, the hash value HV may have a size of 512 bits. Therefore, the hash value HV used in the cryptographic IP 300 may have a predetermined (and/or desired) size according to the hash type information HTYPE.

Accordingly, the length control logic 174 may set the length of the hash value HV, resulting from the hash operation performed on the secure data, based on the hash type information HTYPE received from the secure processor 200. In this manner, a flexible cryptographic architecture may be provided, by enabling various different secure hashing algorithms and corresponding hash value lengths to be configured depending on required (and/or desired) security levels and/or available memory capacity, which may be particularly advantageous for resource-constrained electronic devices (e.g., mobile devices with limited processing and/or memory resources), for example.

Figure 4:
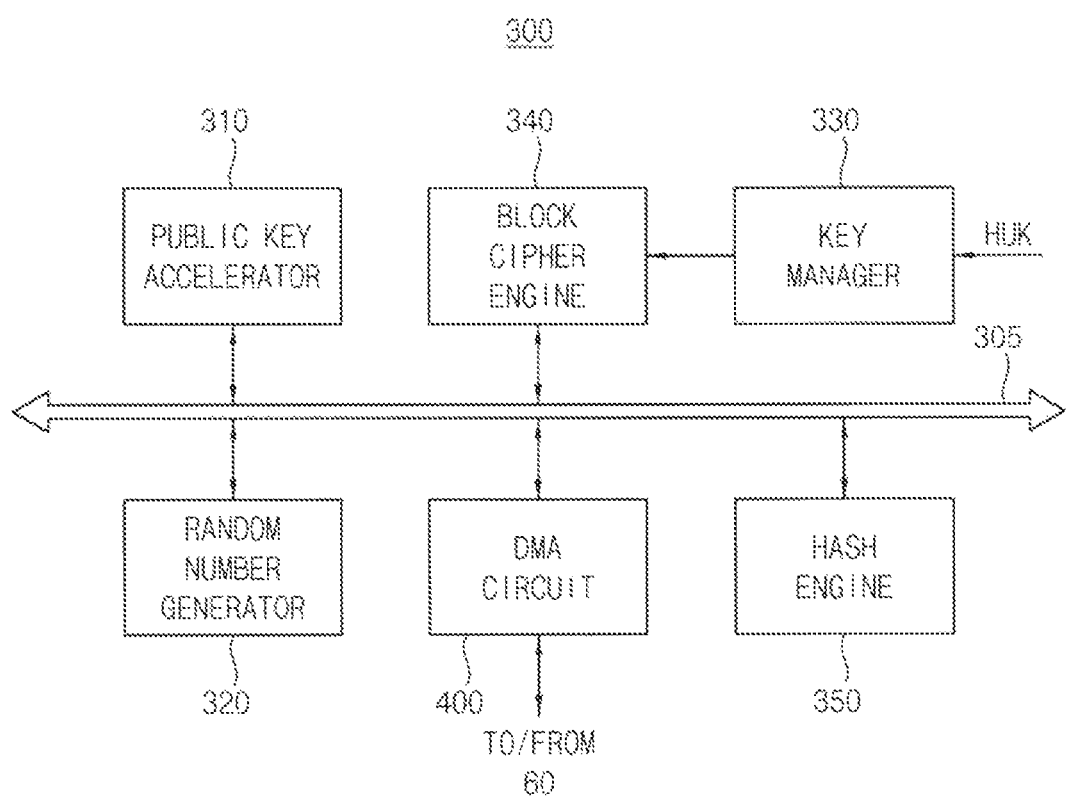
FIG. 4 is a block diagram illustrating an example of the cryptographic IP in the security device in FIG. 1 according to some example embodiments.

FIG. 4 is a block diagram illustrating an example of the cryptographic IP in the security device in FIG. 1 according to some example embodiments.

Referring to FIG. 4, the cryptographic IP 300 may include a public key accelerator 310, a random number generator 320, a key manager 330, a block cipher engine 340, a hash engine 350, and/or a DMA circuit 400. The cryptographic IP 300 may control and/or configure one or more components thereof according to the control and/or configuration set by the secure processor 200, for example. One or more of the public key accelerator 310, the random number generator 320, the key manager 330, the block cipher engine 340, the hash engine 350, the DMA circuit 400, and/or components thereof may be implemented via hardware components, and/or a combination of hardware and software stored in storage media, according to some example embodiments. For example, hardware may be implemented using processing circuitry such as, but not limited to, one or more processors, controllers, ALUs, DSPs, microcomputers, FPGAs, SoCs, PLUs, microprocessors, ASICs, or any other device(s) capable of being customized into special purpose processing circuitry and/or configured for responding to and executing instructions in a defined manner.

The public key accelerator 310, the random number generator 320, the block cipher engine 340, the hash engine 350, and the DMA circuit 400 may be connected to each other through an internal bus 305. The key manager 330 is connected only to the block cipher engine 340 and to the unclonable storage device 150 of FIG. 1 (not shown in FIG. 4).

The public key accelerator 310 may perform a signature certification operation on secure data, including a firmware image and/or sensitive data to be certified (or authenticated), by using a random number generated by the random number generator 320 and a key value. The firmware image may be provided to the public key accelerator 310 from an external source.

The random number generator 320 may generate random numbers and may provide the random numbers to the public key accelerator 310.

The key manager 330 may provide the block cipher engine 340 with the hardware unique key HUK stored in the unclonable storage device 150. The block cipher engine 340 may perform an encryption operation on the secure data to generate encrypted secure data, and may perform a decryption on the encrypted secure data to generate decrypted secure data, using the hardware unique key HUK.

The block cipher engine 340 may perform the encryption operation and the decryption operation by using a block cipher algorithm for performing the encryption and the decryption in block units, for example. That is, the encryption and the decryption may be performed block by block. For example, the block cipher engine 340 may perform the encryption and the decryption by using a block cipher algorithm such as data encryption standard (DES), 3DES, advanced encryption standard (AES), or SEED.

The hash engine 350 may receive the hash type information HTYPE from the secure processor 200, and may perform a hash operation corresponding to the hash type information HTYPE on an output of the block cipher engine 340 to generate the hash value HV. Therefore, the hash value HV may have a predetermined (and/or desired) data size corresponding to the hash type information HTYPE. A hash algorithm of the hash engine 350 is a function for converting an input value with a random length into an output value with a fixed length. Here, the output value of the hash engine 350 is a hash value corresponding to the secure data.

The DMA circuit 400 may provide the output of the block cipher engine 340 to the external storage 60 (e.g., during a secure back-up operation), and/or may provide the data from the external storage 60 to the block cipher engine 340 and/or the hash engine 350 (e.g., during a secure restoring operation). The DMA circuit 400 may control data access to the external storage 60.

Figure 5:
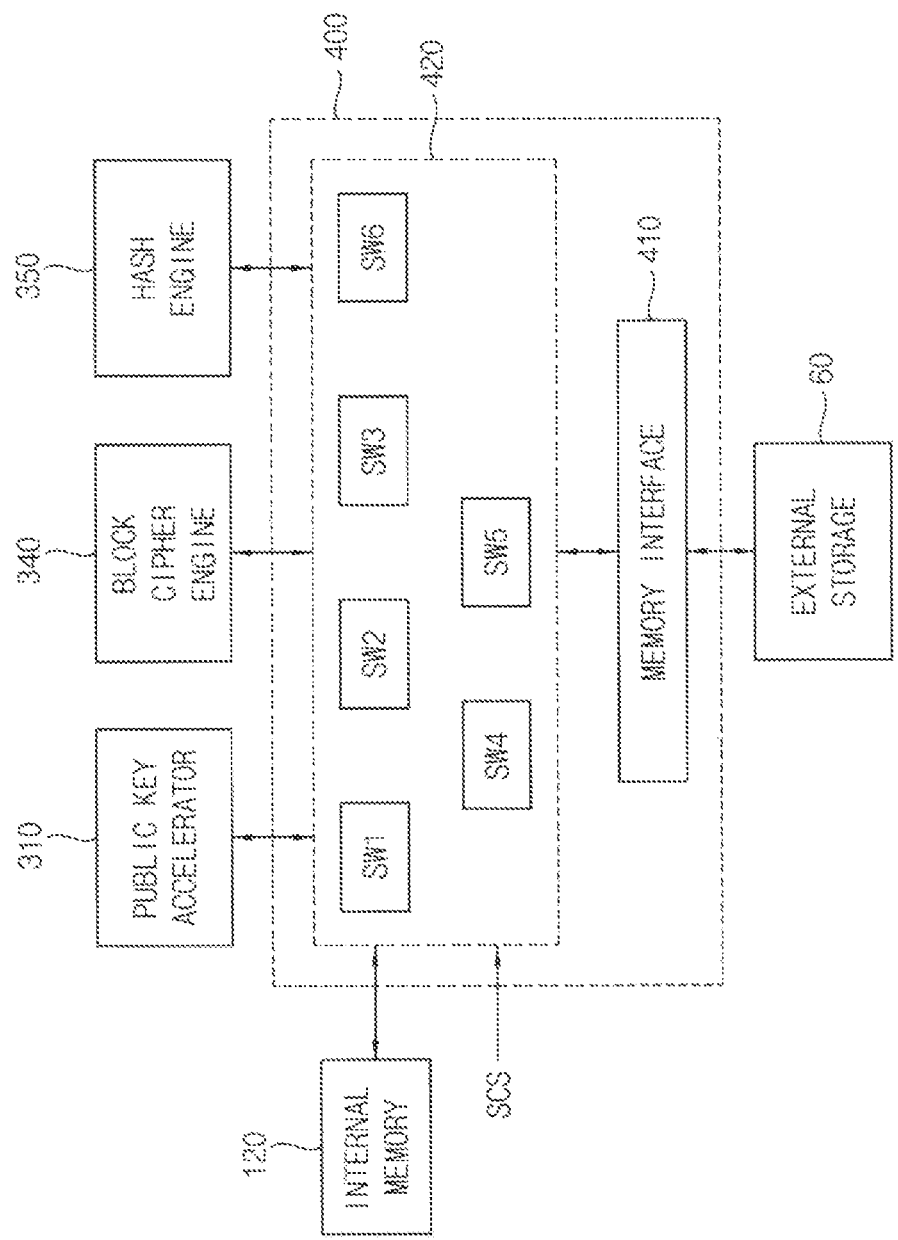
FIG. 5 illustrates an example of the DMA circuit in the cryptographic IP of FIG. 5 according to some example embodiments.

FIG. 5 illustrates an example of the DMA circuit in the cryptographic IP of FIG. 5 according to some example embodiments.

In FIG. 5, the internal memory 120, the public key accelerator 310, the random number generator 320, the block cipher engine 340, the hash engine 350, and the external storage 60 are illustrated with the DMA circuit 400 for convenience of explanation.

Referring to FIG. 5, the DMA circuit 400 may include a memory interface 410 and/or a switching circuit 420.

The memory interface 410 may be connected to the external storage 60, and the switching circuit 420 may include a plurality of switches SW1~SW6, for example. However, the plurality of switches SW1~SW6 is to be construed as a non-limiting example, and a fewer or greater number of switches may be provided, as appropriate, according to some other example embodiments.

The switching circuit 420 may connect some (e.g., subsets) of the internal memory 120, the public key accelerator 310, the random number generator 320, the block cipher engine 340, the hash engine 350, and the memory interface 410 to each other in response to receiving a switching control signal SCS from the secure processor 200. That is, the security device 100 may set a configuration of the DMA circuit 400 by using the switching control signal SCS received from the secure processor 200 to set a connection path among the internal memory 120, the public key accelerator 310, the random number generator 320, the block cipher engine 340, the hash engine 350, and the memory interface 410. For example, different connection paths among the plurality of switches SW1~SW6 of the switching circuit 420 may be set depending on whether a secure back-up operation or a secure restoring operation is to be performed. Although some examples of connection paths among the plurality of switches SW1~SW6 are discussed below (e.g., in connection with FIGS. 7-12), such examples are to be construed as being non-limiting, and those having ordinary skill in the art will recognize that various other configurations of connection paths among the plurality of switches SW1~SW6 are possible.

Figure 6:
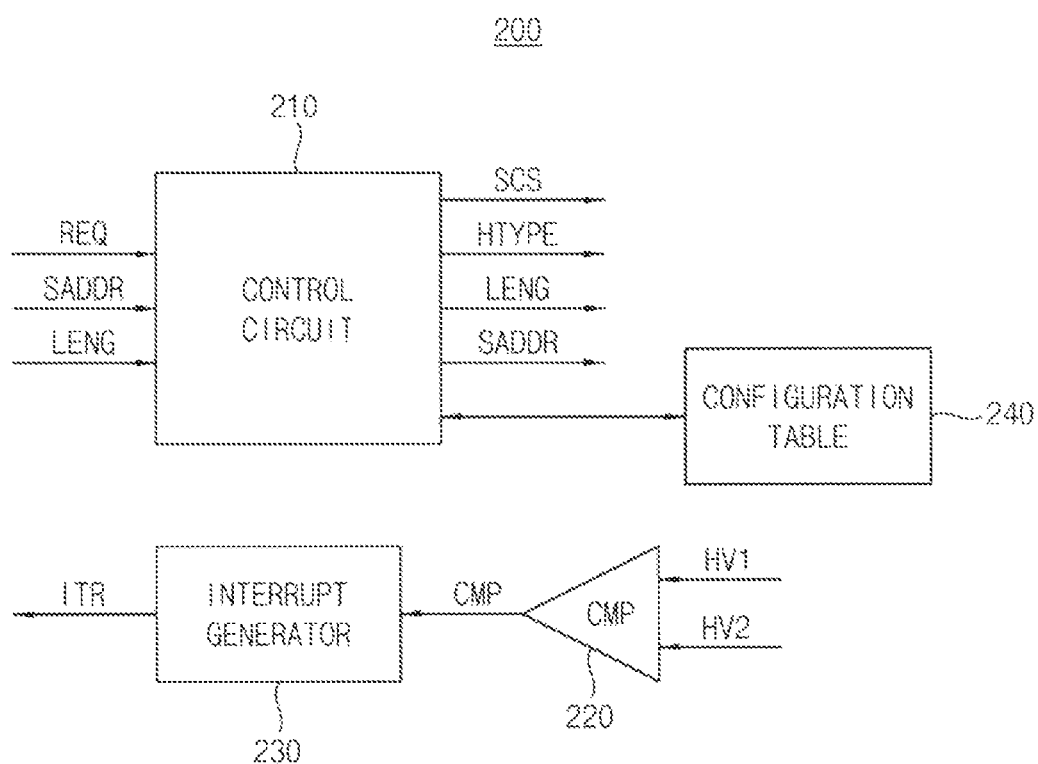
FIG. 6 is a block diagram illustrating an example of the secure processor in the security device in FIG. 1 according to some example embodiments.

FIG. 6 is a block diagram illustrating an example of the secure processor in the security device in FIG. 1 according to some example embodiments.

Referring to FIG. 6, the secure processor 200 may include a control circuit 210, a comparator 220, and/or an interrupt generator 230. In some example embodiments, the secure processor 200 may further include a configuration table 240. The secure processor 200 may control and/or configure one or more components thereof, for example. The control circuit 210, the comparator 220, and/or the interrupt generator 230 may be implemented via hardware components, and/or a combination of hardware and software stored in storage media, according to some example embodiments. For example, hardware may be implemented using processing circuitry such as, but not limited to, one or more processors, controllers, ALUs, DSPs, microcomputers, FPGAs, SoCs, PLUs, microprocessors, ASICs, or any other device(s) capable of being customized into special purpose processing circuitry and/or configured for responding to and executing instructions in a defined manner.

The control circuit 210 may receive a request REQ from the CPU 50 via the mail box 110, and may generate the switching control signal SCS and the hash type information HTYPE corresponding to a secure operation designated by the request REQ. The control circuit 210 may provide the switching control signal SCS to the switching circuit 420 in FIG. 5, and may provide the hash type information HTYPE to the length control logic 174 in FIG. 3 and the hash engine 350 in FIG. 4, respectively.

In addition, the control circuit 210 may receive, from the secure DMA circuit 140, a start address SADDR and length information LENG associated with a memory location in which the secure data is stored in the internal memory 120, and may store the start address SADDR and the length information LENG in the configuration table 240.

The comparator 220 may compare a first hash value HV1 and a second hash value HV2 to generate a comparison signal CMP that indicates integrity of the secure data stored in the external storage 60. The first hash value HV1 may be generated during a secure back-up operation and the second hash value HV2 may be generated during a secure restoring operation. The interrupt generator 230 may receive the comparison signal CMP from the comparator 220, may generate an interrupt signal ITR based on a logic level of the comparison signal CMP, and may provide the CPU 50 with the interrupt signal ITR indicating the integrity of the secure data stored in the external storage 60.

For example, when the first hash value HV1 is the same as the second hash value HV2, the comparator 220 may generate a first comparison signal CMP having a first logic level (a logic high level). In response to receiving the first comparison signal CMP having the first logic level (the logic high level) from the comparator 220, the interrupt generator 230 may generate a first interrupt signal ITR indicating that the first hash value HV1 is the same as the second hash value HV2. The interrupt generator 230 may provide the CPU 50 with the first interrupt signal ITR, to indicate that the secure data passed the integrity verification operation. When the CPU 50 receives the first interrupt signal ITR from the interrupt generator 230, the CPU 50 may determine that the secure data stored in the external storage 60 has not been altered by an external attack, and the secure processor 200 may execute a secure application by using the integrity-verified secure data.

For example, when the first hash value HV1 is different from the second hash value HV2, the comparator 220 may generate a second comparison signal CMP having a second logic level (a logic low level). In response to receiving the second comparison signal CMP having the second logic level (the logic low level) from the comparator 220, the interrupt generator 230 may generate a second interrupt signal ITR indicating that the first hash value HV1 is different from the second hash value HV2. The interrupt generator 230 may provide the CPU 50 with the second interrupt signal ITR, to indicate that the secure data failed the integrity verification operation. When the CPU 50 receives the second interrupt signal ITR from the interrupt generator 230, the CPU 50 may determine that the secure data stored in the external storage 60 has been altered by an external attack, and may take a proper counter action to delete the secure data stored in the external storage 60 and/or to notify a user of the external attack. Although a logic high level is described above in connection with the secure data passing the integrity verification operation (e.g., logic level=1 when HV1 and HV2 match each other) and a logic low level is described above in connection with the secure data failing the integrity verification operation (e.g., logic level=0 when HV1 and HV2 do not match each other), those having ordinary skill in the art will recognize that the opposite configuration is also possible according to some other example embodiments. That is, the comparison signal CMP may have a logic low level (=0) when HV1 and HV2 match and a logic high level (=1) when HV1 and HV2 do not match, according to some other example embodiments.

Figure 7:
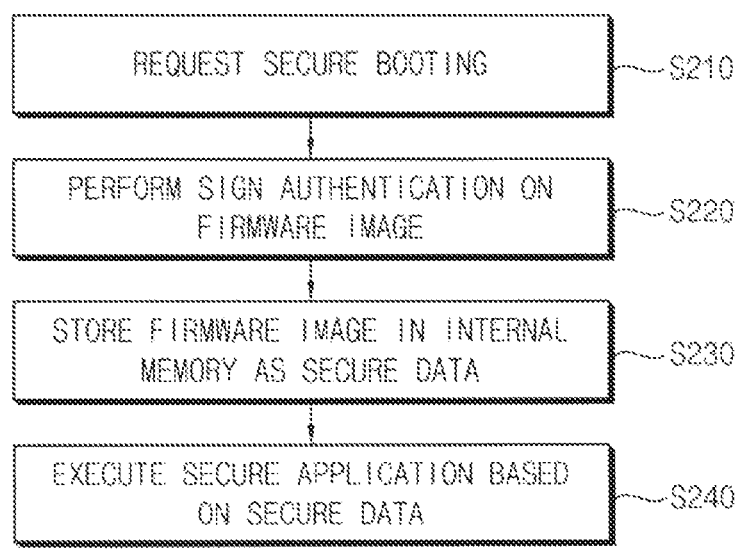
FIG. 7 is a flow chart illustrating that the security device in FIG. 1 performs a signature certification operation.
Figure 8:
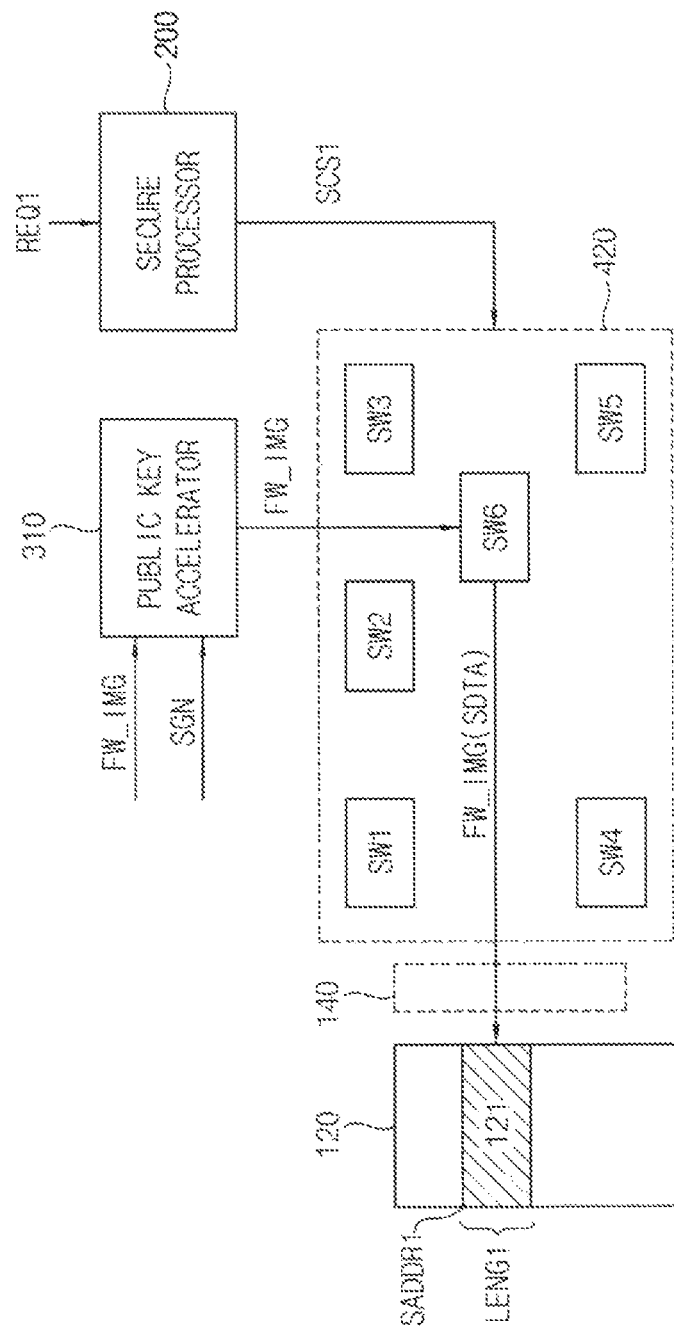
FIG. 8 illustrates a connection relationship of the DMA circuit in FIG. 5 when the security device in FIG. 1 performs the signature certification operation.

FIG. 7 is a flow chart illustrating that the security device in FIG. 1 performs a signature certification operation. FIG. 8 illustrates a connection relationship of the DMA circuit in FIG. 5 when the security device in FIG. 1 performs the signature certification operation.

Referring to FIGS. 1 through 8, in case of powering-on in which power is applied to the electronic device 10, or in case a signature certification operation (or signature authentication) is to be performed on a firmware image when the firmware is updated in the electronic device 10, the CPU 50 provides a first request REQ1 (e.g., requesting a secure booting operation) designating a signature certification operation to the secure processor 200 through the mail box 110 (S210).

The secure processor 200 provides a first switching control signal SCS1 to the switching circuit 420 in response to receiving the first request REQ1 from the CPU 50.

The secure processor 200 controls the public key accelerator 310 to perform a signature certification operation on a firmware image FW_IMF received from an external source (S220). The public key accelerator 310 may generate a hash value based on the firmware image FW_IMG and may perform the signature certification operation by using the hash value and a signature SGN associated with the firmware image FW_IMG. The signature SGN may also be received from the external source.

The public key accelerator 310 may provide the switching circuit 420 with the signature-certified firmware image FW_IMG, and the switch SW6 in the switching circuit 420 transfers the signature-certified firmware image FW_IMG to the secure DMA circuit 140 (S230).

The secure DMA circuit 140 may store the signature-certified firmware image FW_IMG in a first region 121 in the internal memory 120 as secure data SDTA in operation S230. The first region 121 in the internal memory 120 may have a first start address SADDR1 and first length information LENG1.

The secure DMA circuit 140 may provide the secure processor 200 with the first start address SADDR1 and the first length information LENG1 of the first region 121 in the internal memory 120, and the control circuit 210 of the secure processor 200 may store, in the configuration table 240, the first start address SADDR1 and the first length information LENG1 of the first region 121 in the internal memory 120. Thus, the secure processor 200 may store, in the configuration table 240, size information and address information of the secure data SDTA stored in the internal memory 120.

The secure processor 200 may execute a secure application based on the secure data SDTA (e.g., the signature-certified firmware image FW_IMG) stored in the internal memory 120 within the isolated execution environment, without intervention of the CPU 50 and independently from the CPU 50 (S240). In this manner, enhanced security of the electronic device 10 including the embedded security device 100 may be provided by performing the secure booting operation, including performing the signature certification operation to cryptographically verify that code being loaded and executed is authentic and has not been modified unknowingly and/or maliciously, which ensures that the secure processor 200 is initialized into a known state and/or executes code from a trusted external source, for example.

Figure 9:
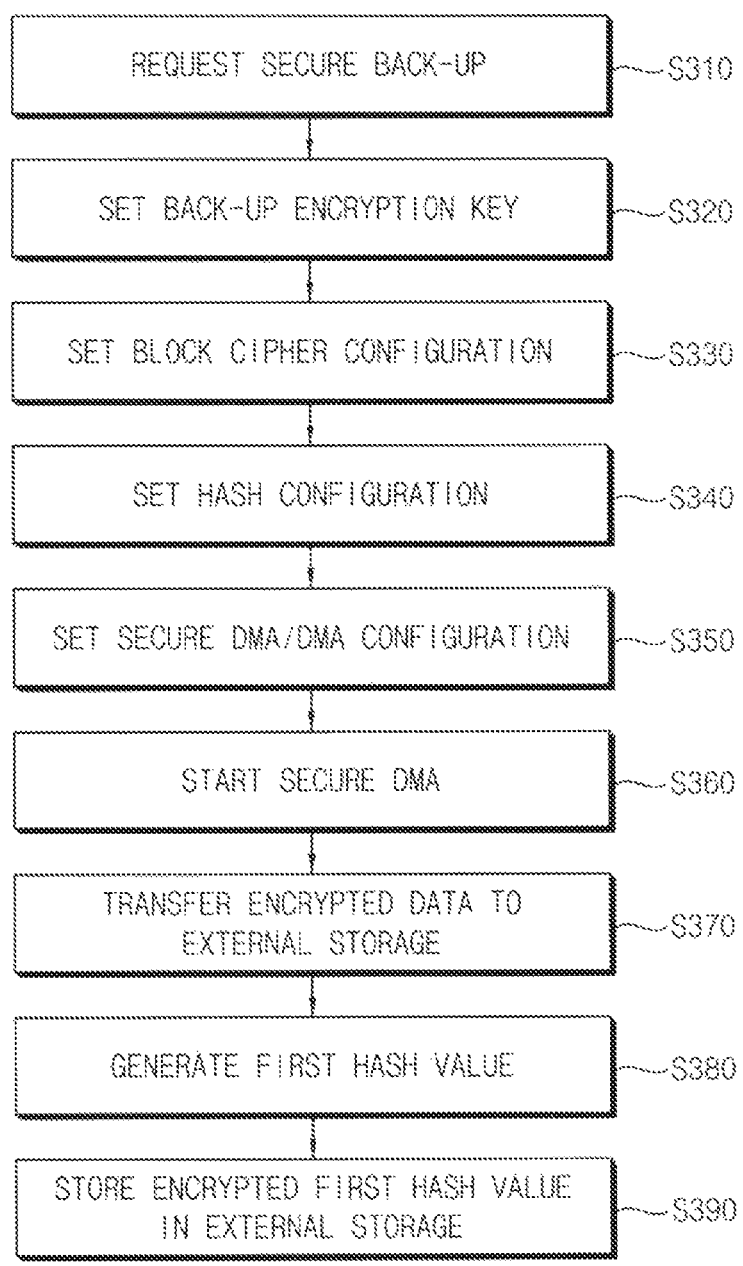
FIG. 9 is a flow chart illustrating that the security device in FIG. 1 performs a secure back-up operation.
Figure 10:
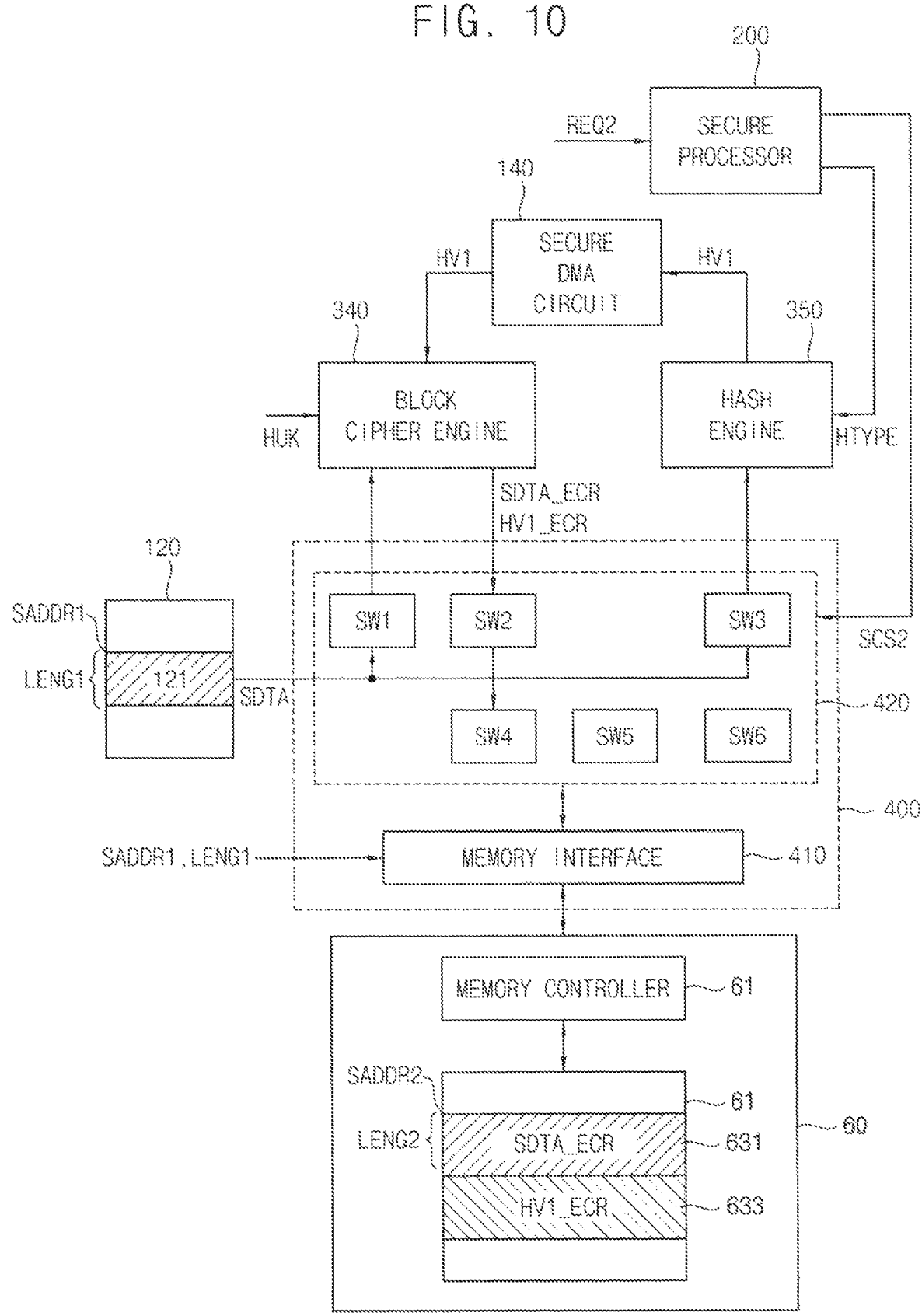
FIG. 10 illustrates a connection relationship of the DMA circuit in FIG. 5 when the security device in FIG. 1 performs the secure back-up operation.

FIG. 9 is a flow chart illustrating that the security device in FIG. 1 performs a secure back-up operation. FIG. 10 illustrates a connection relationship of the DMA circuit in FIG. 5 when the security device in FIG. 1 performs the secure back-up operation.

Referring to FIGS. 1 through 6, 9, and 10 when the electronic device 10 is to enter into a low power mode, such as a stand-by mode or a sleep mode, while the secure processor 200 of the security device 100 executes the secure application within the isolated execution environment, the CPU 50 provides a second request REQ2 designating a secure back-up operation of the secure data SDTA to the secure processor 200 through the mail box 110 (S310).

When the secure processor 200 receives the second request REQ2 from the CPU 50, the secure processor 200 controls the key manager 330 to retrieve the hardware unique key HUK from the unclonable storage device 150, and to set the hardware unique key HUK as an encryption key which is used for the secure back-up operation (S320).

The secure processor 200 controls the key manager 330 to provide the hardware unique key HUK to the block cipher engine 340 to set a configuration of the block cipher engine 340 (S330).

The secure processor 200 provides the hash type information HTYPE to the hash engine 350 to set a configuration of the hash engine 350 (S340). The hash engine 350 receives the hash type information HTYPE from the secure processor 200, and selects one of a plurality of secure hash algorithms (e.g., SHA-1, SHA-256, SHA-384, or SHA-512), corresponding to the hash type information HTYPE.

The secure processor 200 provides a second switching control signal SCS2 to the switching circuit 420, in response to receiving the second request REQ2 from the CPU 50, to set a configuration of the DMA circuit 400 (S350). The secure processor 200 also provides the hash type information HTYPE to the secure DMA circuit 140 to set a configuration of the secure DMA circuit 140 (S350).

For example, the switch SW1 connects the internal memory 120 to the block cipher engine 340, the switch SW3 connects the internal memory 120 to the hash engine 350, and the switches SW2 and SW4 connect the block cipher engine 340 to the memory interface 410, in response to the switching circuit 420 receiving the second switching control signal SCS2 from the secure processor 200. Thus, the secure processor 200 controls the switching circuit 420 of the DMA circuit 400 to set a connection path among the plurality of switches SW1~SW6 for the secure back-up operation, according to the second switching control signal SCS2.

The secure processor 200 controls the secure DMA circuit 140 to provide the secure data SDTA stored in the first region 121 of the internal memory 120 to the switching circuit 420 of the DMA circuit 400 (S360).

For example, the switch SW1 in the switching circuit 420 receives the secure data SDTA stored in the internal memory 120 from the secure DMA circuit 140 and transfers the secure data SDTA to the block cipher engine 340. The switch SW3 also receives the secure data SDTA stored in the internal memory 120 from the secure DMA circuit 140 and transfers the secure data SDTA to the hash engine 350, in parallel with the switch SW1 transferring the secure data SDTA to the block cipher engine 340. The block cipher engine 340 performs an encryption operation on the secure data SDTA received from the switch SW1 by using the hardware unique key HUK to generate encrypted secure data SDTA_ECR, and provides the memory interface 410 with the encrypted secure data SDTA_ECR through the switches SW2 and SW4.

The memory interface 410 of the DMA circuit 400 receives the first start address SADDR1 and the first length information LENG1 (e.g., stored in the configuration table 240) associated with the secure data SDTA from the secure processor 200. The memory interface 410 provides the external storage 60 with the first start address SADDR1, the first length information LENG1, and the encrypted secure data SDTA_ECR (S370). The memory controller 61 of the external storage 60 determines a size of the encrypted secure data SDTA_ECR based on the first start address SADDR1 and the first length information LENG1, and stores the encrypted secure data SDTA_ECR in a first region 631 in the memory device 63 safely in view of cryptology. The first region 631 of the memory device 63 may have a second start address SADDR2 and second length information LENG2. The control circuit 210 of the secure processor 200 may also store the second start address SADDR2 and the second length information LENG2 in the configuration table 240.

In parallel with the block cipher engine 340 performing the encryption operation on the secure data SDTA received from the switch SW1, the hash engine 350 performs a hash operation, corresponding to the hash type information HTYPE received from the secure processor 200, on the secure data SDTA received from the switch SW3 to generate a first hash value HV1 (S380). The hash engine 350 provides the block cipher engine 340 with the first hash value HV1 through the secure DMA circuit 140. The secure DMA circuit 140 stores the first hash value HV1 in the hash register 142.

The block cipher engine 340 receives the first hash value HV1 from the hash engine 350 through the secure DMA circuit 140, performs an encryption operation on the first hash value HV1 by using the hardware unique key HUK to generate an encrypted first hash value HV1_ECR, and provides the memory interface 410 with the encrypted first hash value HV1_ECR through the switches SW2 and SW4, for example.

The memory interface 410 provides the encrypted first hash value HV1_ECR to the external storage 60, and the external storage 60 may store the encrypted first hash value HV1_ECR in a second region 633 of the memory device 63 (S390). The second region 633 and the first region 631 of the memory device 63 may have consecutive addresses, for example.

In this case, the secure processor 200 sets a configuration of the DMA circuit 400 and a start address of the external storage 60, in which the encrypted secure data SDTA_ECR is to be stored, and hardware of the security device 100 (e.g., the secure DMA circuit 140, the cryptographic IP 300, the DMA circuit 400, and/or components thereof) automatically performs one or more other secure operations within the isolated execution environment and without intervention of the CPU 50. In this manner, enhanced security of the electronic device 10 including the embedded security device 100 may be provided by performing the secure back-up operation, which may prevent or reduce the risk of the secure data being lost and/or corrupted when entering into and/or during the low power mode, for example.

Figure 11:
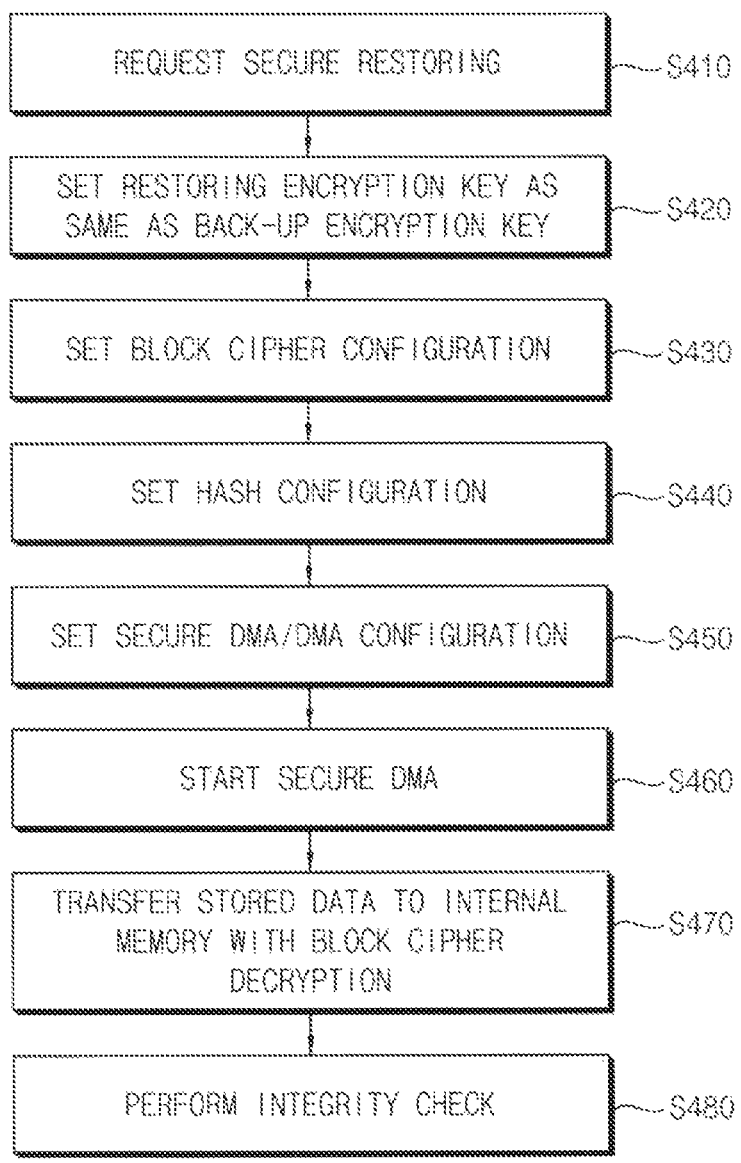
FIG. 11 is a flow chart illustrating that the security device in FIG. 1 performs a secure restoring operation.
Figure 12:
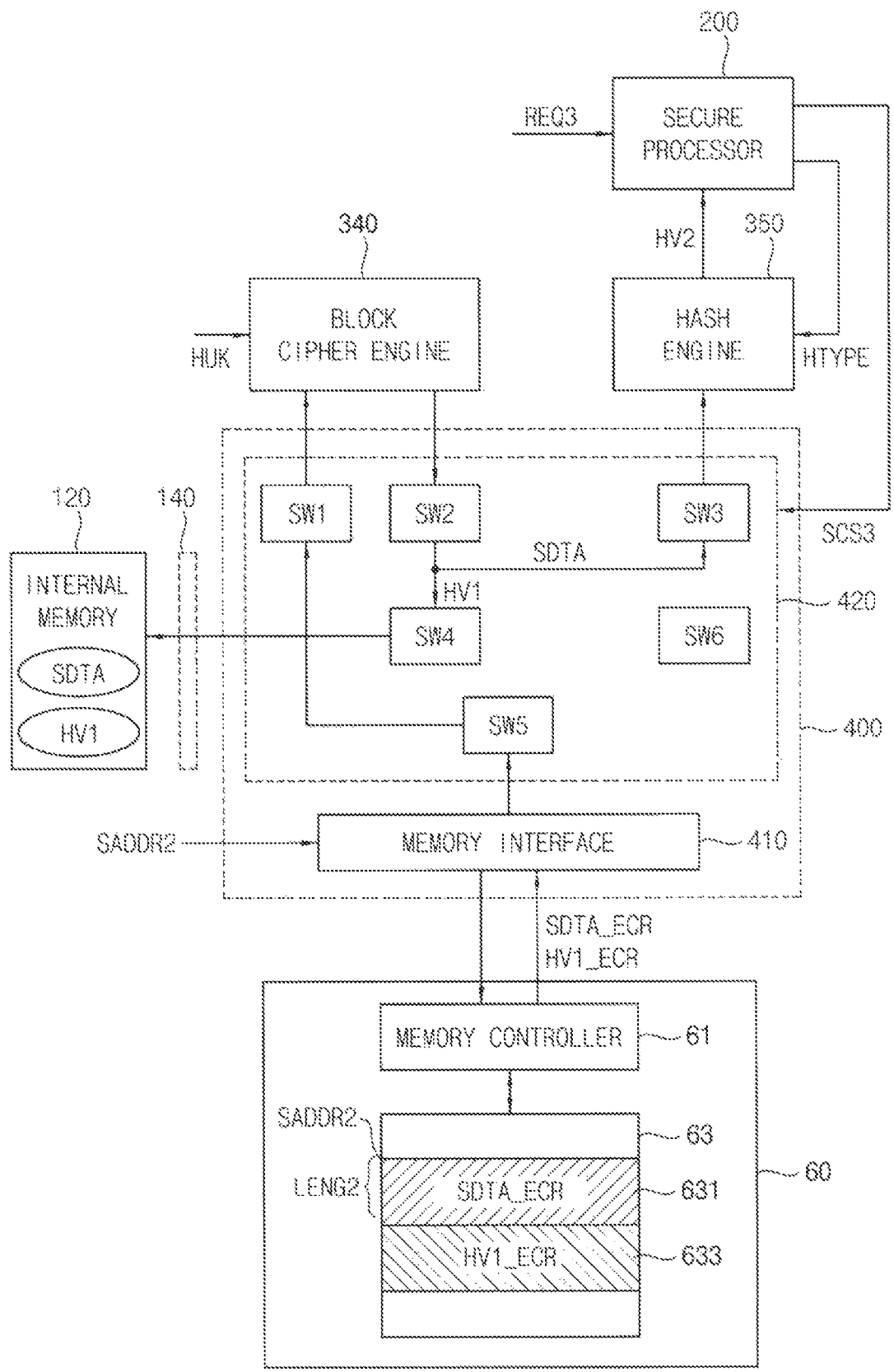
FIG. 12 illustrates a connection relationship of the DMA circuit in FIG. 5 when the security device in FIG. 1 performs the secure restoring operation.

FIG. 11 is a flow chart illustrating that the security device in FIG. 1 performs a secure restoring operation. FIG. 12 illustrates a connection relationship of the DMA circuit in FIG. 5 when the security device in FIG. 1 performs the secure restoring operation.

Referring to FIGS. 1 through 6, 11, and 12 when the electronic device 10 is to exit from the low power mode (e.g., the stand-by mode or the sleep mode) while the security device 100 operates in the low power mode, the CPU 50 receives a wake-up request and provides a third request REQ3 designating a secure restoring operation to the secure processor 200 through the mail box 110 (S410).

When the secure processor 200 receives the third request REQ3 from the CPU 50, the secure processor 200 controls the key manager 330 to retrieve the hardware unique key HUK from the unclonable storage device 150, and to set the hardware unique key HUK as an encryption key which is used for the secure restoring operation (S420). That is, the secure processor 200 controls the key manager 330 such that the same hardware unique key HUK that is used for the secure back-up operation is also used for the secure restoring operation.

The secure processor 200 controls the key manager 330 to provide the hardware unique key HUK to the block cipher engine 340 to set a configuration of the block cipher engine 340 (S430).

The secure processor 200 provides the hash type information HTYPE to the hash engine 350 to set a configuration of the hash engine 350 (S440). The hash engine 350 receives the hash type information HTYPE from the secure processor 200, and selects one of a plurality of secure hash algorithms (e.g., SHA-1, SHA-256, SHA-384, or SHA-512), corresponding to the hash type information HTYPE. That is, the secure processor 200 controls the hash engine 350 such that the same secure hash algorithm that is used for the secure back-up operation is also used for the secure restoring operation.

The secure processor 200 provides a third switching control signal SCS3 to the switching circuit 420, in response to receiving the third request REQ3 from the CPU 50, to set a configuration of the DMA circuit 400 (S450). The secure processor 200 also provides the hash type information HTYPE to the secure DMA circuit 140 to set a configuration of the secure DMA circuit 140 (S450).

For example, the switches SW5 and SW1 connect the memory interface 410 to the block cipher engine 340, the switch SW2 connects the block cipher engine 340 to the switches SW4 and SW3, the switch SW4 is connected to the internal memory 120, and the switch SW3 is connected to the hash engine 350, in response to the switching circuit 420 receiving the third switching control signal SCS3 from the secure processor 200. Thus, the secure processor 200 controls the switching circuit 420 of the DMA circuit 400 to set a connection path among the plurality of switches S1~SW6 for the secure restoring operation, according to the third switching control signal SCS3.

The secure processor 200 controls the DMA circuit 400 to provide the encrypted secure data SDTA_ECR stored in the first region 631 and the encrypted first hash value HV1_ECR stored in the second region 633 in the memory device 63 of the external storage 60 to the block cipher engine 340 through the switching circuit 420 of the DMA circuit 400 (S460).

The memory interface 410 of the DMA circuit 400 receives the second start address SADDR2 (e.g., stored in the configuration table 240) associated with the encrypted secure data SDTA_ECR from the secure processor 200, and provides the external storage 60 with the second start address SADDR2. The memory controller 61 of the external storage 60 retrieves the encrypted secure data SDTA_ECR from the first region 631 of the memory device 63 and the encrypted first hash value HV1_ECR from the second region 633 of the memory device 63 based on the second start address SADDR2, and provides the memory interface 410 with the encrypted secure data SDTA_ECR and the encrypted first hash value HV1_ECR. The memory interface 410 provides the block cipher engine 340 with the encrypted secure data SDTA_ECR and the encrypted first hash value HV1_ECR through the switches SW5 and SW1 of the switching circuit 420, for example.

The block cipher engine 340 performs a decryption operation on the encrypted secure data SDTA_ECR and the encrypted first hash value HV1_ECR by using the hardware unique key HUK to generate decrypted secure data SDTA and a decrypted first hash value HV1, and outputs the decrypted secure data SDTA and the decrypted first hash value HV1 to the switching circuit 420. The secure DMA circuit 140 receives the decrypted secure data SDTA and the decrypted first hash value HV1 from the block cipher engine 340 through the switches SW2 and SW4 of the switching circuit 420, for example, and stores the decrypted secure data SDTA and the decrypted first hash value HV1 in the internal memory 120 (S470).

The hash engine 350 receives the decrypted secure data SDTA from the block cipher engine 340 through the switches SW2 and SW3 of the switching circuit 420, for example, performs a hash operation, corresponding to the hash type information HTYPE received from the secure processor 200, on the decrypted secure data SDTA to generate a second hash value HV2, and provides the second hash value HV2 to the secure DMA circuit 140. The secure DMA circuit 140 stores the second hash value HV2 in the hash register 142.

The comparator 220 in the secure processor 200 compares the decrypted first hash value HV1 and the second hash value HV2 stored in the hash register 142 of the secure DMA circuit 140 to perform an integrity verification operation on the decrypted secure data SDTA (S480).

For example, when the decrypted first hash value HV1 is the same as the second hash value HV2, the comparator 220 may generate a first comparison signal CMP having a first logic level (a logic high level). In response to receiving the first comparison signal CMP having the first logic level (the logic high level) from the comparator 220, the interrupt generator 230 may generate a first interrupt signal ITR indicating that the decrypted first hash value HV1 is the same as the second hash value HV2. The interrupt generator 230 may provide the CPU 50 with the first interrupt signal ITR, to indicate that the decrypted secure data SDTA passed the integrity verification operation. When the CPU 50 receives the first interrupt signal ITR from the interrupt generator 230, the CPU 50 may determine that the encrypted secure data SDTA_ECR stored in the external storage 60 has not been altered by an external attack, and the secure processor 200 may execute a secure application by using the integrity-verified decrypted secure data SDTA stored in the internal memory 120. In this manner, enhanced performance, efficiency, and security of the electronic device 10 including the embedded security device 100 may be provided by performing the secure restoring operation, thereby enabling the secure processor 200 to safely use the integrity-verified decrypted secure data SDTA (e.g., for warm boot) without requiring an additional signature certification operation to be performed (e.g., by the CPU 50, the security device 100 or components thereof) when waking up from the low power mode, for example.

For example, when the decrypted first hash value HV1 is different from the second hash value HV2, the comparator 220 may generate a second comparison signal CMP having a second logic level (a logic low level). In response to receiving the second comparison signal CMP having the second logic level (the logic low level) from the comparator 220, the interrupt generator 230 may generate a second interrupt signal ITR indicating that the decrypted first hash value HV1 is different from the second hash value HV2. The interrupt generator 230 may provide the CPU 50 with the second interrupt signal ITR, to indicate that the decrypted secure data SDTA failed the integrity verification operation. When the CPU 50 receives the second interrupt signal ITR from the interrupt generator 230, the CPU 50 may determine that the encrypted secure data SDTA_ECR stored in the external storage 60 has been altered by an external attack, and may take a proper counter action to delete the encrypted secure data SDTA_ECR stored in the external storage 60 and/or to notify a user of the external attack. However, as discussed above in connection with FIG. 6, those having ordinary skill in the art will recognize that the comparison signal CMP may have a logic low level (=0) when the decrypted first hash value HV1 and the hash value HV2 match and a logic high level (=1) when the decrypted first hash value HV1 and the hash value HV2 do not match, according to some other example embodiments.

Therefore, since the electronic device 10 is a mobile device or an internet of things (IoT) device, for example, and the electronic device 10 may frequently switch between the low power mode and wake-up to reduce power consumption, the integrity-verified secure data which is used in the security device 100 may be used quickly and safely without reloading the secure data (e.g., from the external source) or requiring another signature certification operation to be performed on the secure data again.

When a conventional electronic device, without an embedded security device such as the aforementioned security device 100 implemented with various hardware components and/or circuitry (including but not limited to the secure processor 200, the secure DMA circuit 140, and/or the cryptographic IP 300 comprising the DMA circuit 400, for example) for performing a secure back-up operation and a secure restoring operation within an isolated execution environment, is to enter into the low power mode, the conventional electronic device stores the secure data in an external storage under control of a CPU, and performs signature certification on the secure data stored in the external storage with intervention of the CPU for warm boot. However, the cryptographic processing and/or calculations required to be performed by the CPU for signature certification may be complex, computationally-intensive, and relatively time-consuming, for example. Further, the lack of an isolated execution environment for performing secure back-up and restoring operations within the conventional electronic device may result in undesirable exposure to security risks, if a hacker is able to control and/or gain access to the CPU and thereby maliciously modify the secure data, for example. Therefore, a substantial amount of processing and/or memory resources, power consumption, and time is required for performing each warm boot with the conventional electronic device, and secure data (such as sensitive data or code) and/or the conventional electronic device itself may be less secure, due to requiring the CPU-implemented signature certification to be performed on the secure data for the warm boot, as compared to the electronic device 10 including the security device 100 according to some example embodiments.

However, according to some example embodiments, the electronic device 10 including the security device 100, implemented with hardware, performs the encryption operation and the hash operation on the secure data SDTA, and stores the encrypted secure data SDTA_ECR and the encrypted first hash value HV1_ECR in the memory device 63 during a secure back-up operation performed before the electronic device 10 enters into the low power mode. The secure data SDTA may include a firmware image which is safely used within the isolated execution environment, or sensitive data generated within the isolated execution environment, without intervention of the CPU 50.

In addition, the security device 100 according to some example embodiments performs the decryption operation on the encrypted secure data SDTA_ECR and the encrypted first hash value HV1_ECR stored in the memory device 63 to restore the decrypted secure data SDTA and the decrypted first hash value HV1 during a secure restoring operation performed in response to a wake-up request to exit from the low power mode, within the isolated execution environment and without intervention of the CPU 50. The security device 100 performs the hash operation on the decrypted secure data SDTA to generate the second hash value HV2. The security device 100 performs the integrity verification operation on the decrypted secure data SDTA by comparing the decrypted first hash value HV1 and the second hash value HV2 to determine whether or not they match each other.

Since the security device 100 is implemented with only hardware according to some example embodiments, performs the secure back-up operation and the secure restoring operation without intervention of the CPU 50 and independently from the CPU 50, and does not need to perform an additional signature certification operation on the decrypted secure data SDTA, the security device 100 may substantially reduce an amount of time required for each warm boot, as compared to the aforementioned conventional electronic device without an embedded security device for performing the secure back-up operation and the secure restoring operation within an isolated execution environment. For example, improved functioning of a computing device such as the electronic device 10 including the embedded security device 100 may be provided by the above-described techniques for performing the secure back-up operation and the secure restoring operation via the secure processor 200, the secure DMA circuit 140, the cryptographic IP 300, the DMA circuit 400, and/or components thereof (e.g., including but not limited to increased security of the secure data and/or the electronic device 10 itself, increased processing efficiency and/or speed, decreased consumption of processing and/or memory resources, reduced power consumption, etc.).

Booting of the electronic device 10 may be classified into a cold boot and a warm boot. The cold boot is the opposite of the warm boot, in which the electronic device 10 is driven in a state where electricity always flows in main parts of the electronic device 10 for the sake of safety of the electronic device 10 or swift booting. The cold boot refers to a function of turning on the electronic device 10 first, or turning off the electronic device 10 and then turning on the electronic device 10 again using a power button.

Figure 13:
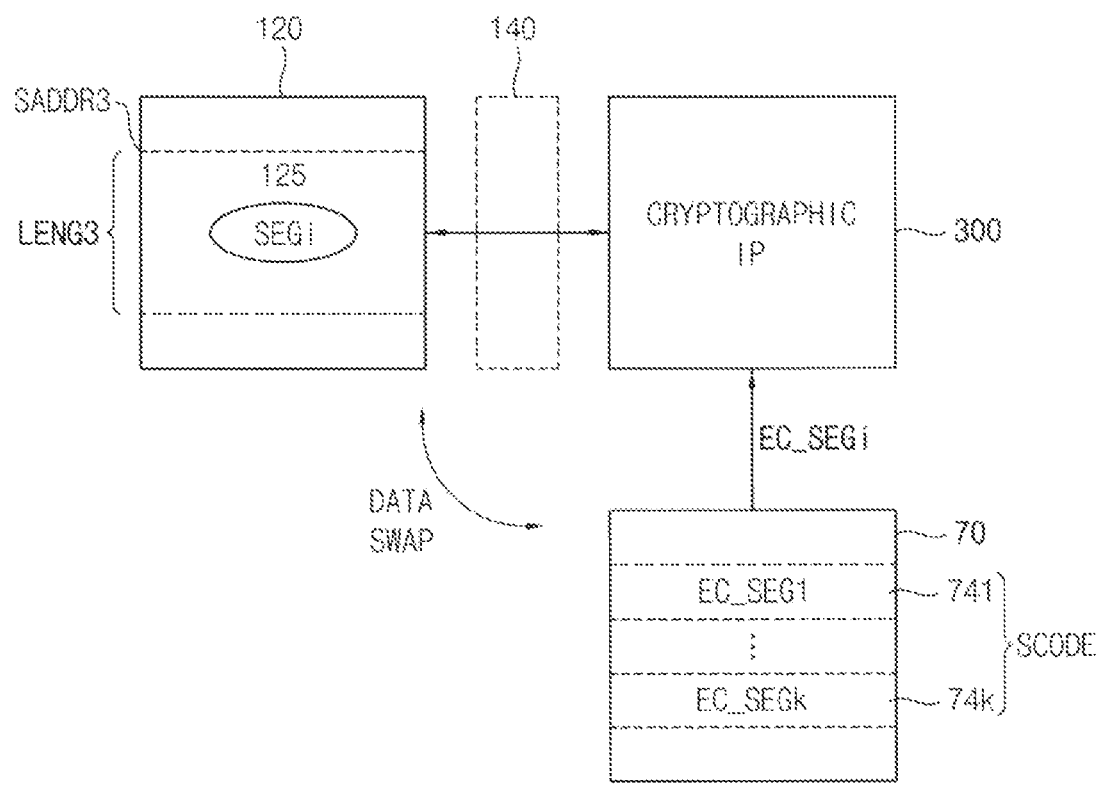
FIG. 13 illustrates that the security device performs a data swap operation according to some example embodiments.

FIG. 13 illustrates that the security device performs a data swap operation according to some example embodiments.

In FIG. 13, it is assumed that a secure code SCODE provided from an external source is stored in the buffer memory 70, and a size of the secure code SCODE is greater than a size of available storage capacity of the internal memory 120. It is also assumed that the secure code SCODE is encrypted before being stored in the buffer memory 70.

The secure code SCODE may be divided into a plurality of encrypted segments EC_SEG1~EC_SEGk, and the plurality of encrypted segments EC_SEG1~EC_SEGk may be stored in a plurality of regions 741~74k in the buffer memory 70, respectively. The plurality of regions 741~74k may have consecutive addresses, for example.

When the security device 100 needs to use the encrypted secure code SCODE, the cryptographic IP 300 may perform a data swap operation to decrypt each of the plurality of encrypted segments EC_SEG1~EC_SEGk, to store a decrypted segment SEGi (e.g., SEG_1) in the available storage capacity of the internal memory 120 through the secure DMA circuit 140, to execute a corresponding application based on the stored decrypted segment SEGi (e.g., SEG_1), and to exchange the stored decrypted segment SEGi (e.g., SEG_1) with a next decrypted segment SEGi (e.g., SEG_2). When the cryptographic IP 300 performs the data swap operation, a previous decrypted segment SEGi (e.g., SEG_1) to be exchanged with the next decrypted segment SEGi (e.g., SEG_2) may be encrypted in the cryptographic IP 300 and an encrypted segment (e.g., EC_SEG1) may be stored in the buffer memory 70.

When the cryptographic IP 300 of the security device 100 performs the data swap operation, the DMA circuit 400 in FIG. 5 may be connected to the buffer memory 70.

The above-mentioned data swap operation may be applied to an electronic device, such as a mobile device or an IoT device, for example, which includes an internal memory having limited data storage capacity.

Figure 14:
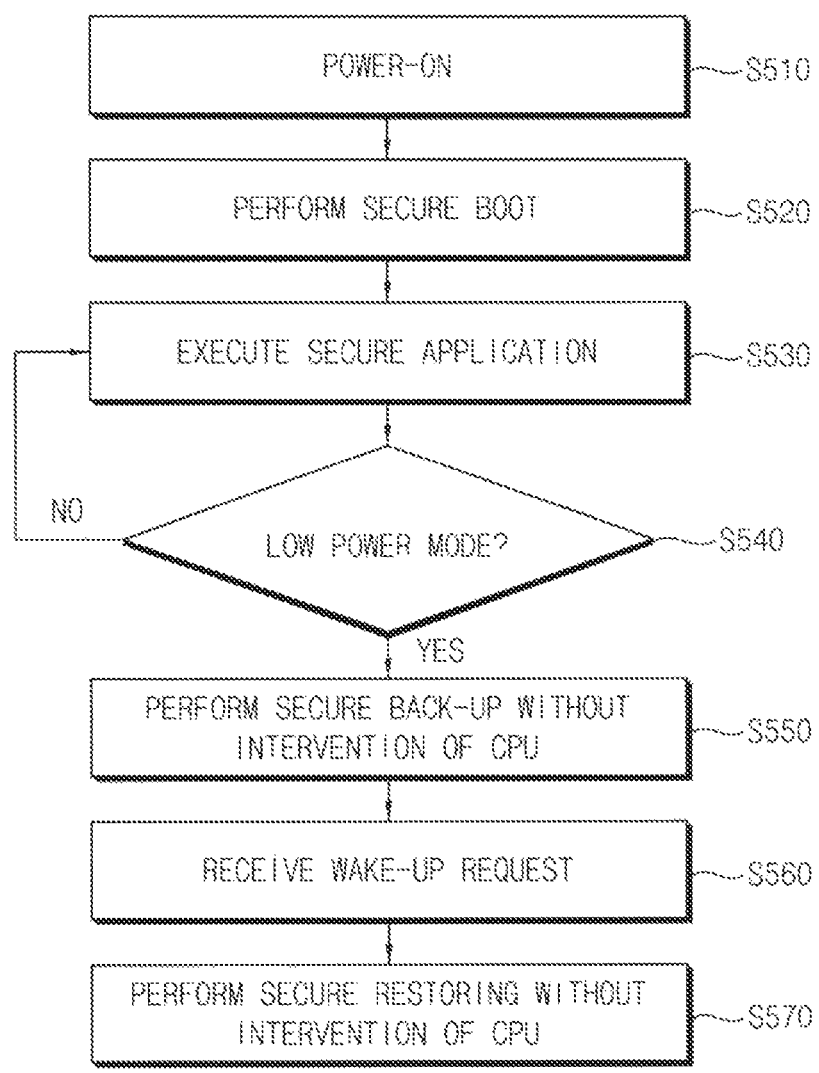
FIG. 14 is a flow chart illustrating a method of operating an electronic device according to some example embodiments.

FIG. 14 is a flow chart illustrating a method of operating an electronic device according to some example embodiments.

Referring to FIGS. 1 through 12 and 14, in a method of operating an electronic device 10 including a CPU 50 and a security device 100 to receive a request (e.g., requesting a secure booting operation) from the CPU 50 and to execute the request within an isolated execution environment with which the CPU 50 does not intervene, power is applied to the electronic device 10 to power-on the electronic device 10 (S510).

A cryptographic IP 300 of the security device 100 performs a signature certification operation on a firmware image, and a secure DMA circuit 140 stores the signature-certified firmware image as secure data SDTA in an internal memory 120 of the security device 100 (S520). A secure processor 200 in the security device 100 executes a secure application based on the secure data SDTA (S530).

The CPU 50 determines whether the electronic device 10 enters into a low power mode (S540). When the electronic device 10 does not enter into the low power mode (No in S540), the process returns to operation S530.

When the electronic device 10 enters into the low power mode (Yes in S540), the cryptographic IP 300 performs a secure back-up operation to encrypt the secure data SDTA using a hardware unique key HUK of the electronic device 10 to generate encrypted secure data SDTA_ECR, and to store the encrypted secure data SDTA_ECR in an external storage 60 connected to the security device 100, without intervention of the CPU 50 (S550).

When the cryptographic IP 300 receives a wake-up request from the CPU 50 (S560), the cryptographic IP 300 performs a secure restoring operation to decrypt the encrypted secure data SDTA_ECR stored in the external storage 60 using the hardware unique key HUK to generate decrypted secure data SDTA, and to store the decrypted secure data SDTA in the internal memory 120 through the secure DMA circuit 140, without intervention of the CPU 50 in response to the wake-up request (S570).

When the cryptographic IP 300 performs the secure back-up operation, the cryptographic IP 300 also performs a hash operation on the secure data SDTA to generate a first hash value HV1, performs an encryption operation on the first hash value HV1 using the hardware unique key HUK to generate an encrypted first hash value HV1_ECR, and stores the encrypted first hash value HV1_ECR in the external storage 60 through the DMA circuit 400, without intervention of the CPU 50 (S550). When the cryptographic IP 300 performs the secure restoring operation, the cryptographic IP 300 also performs a decryption operation on the encrypted first hash value HV1_ECR using the hardware unique key HUK, performs a hash operation on the decrypted secure data SDTA to generate a second hash value HV2, and performs the integrity verification operation on the decrypted secure data SDTA by comparing the decrypted first hash value HV1 and the second hash value HV2 to determine whether or not they match each other.

Figure 15:
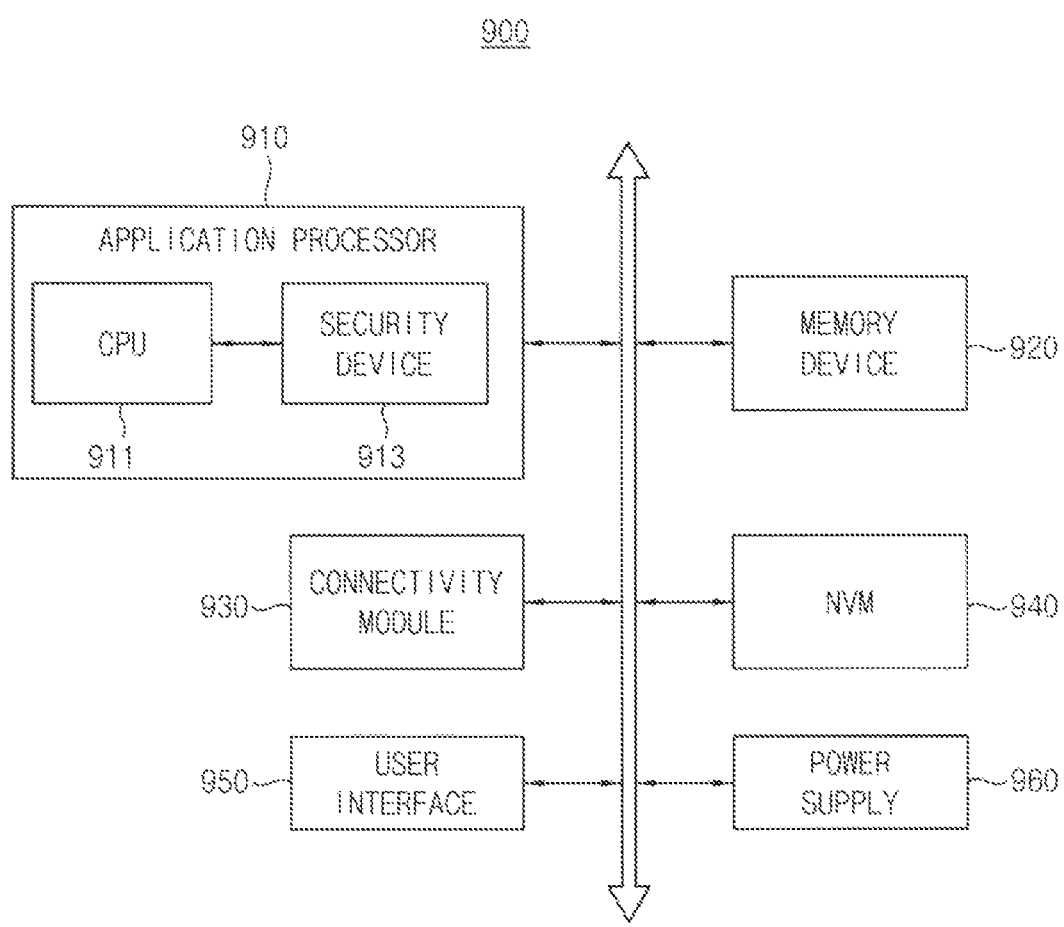
FIG. 15 is a block diagram illustrating a mobile system 900 according to some example embodiments.

FIG. 15 is a block diagram illustrating a mobile system 900 according to some example embodiments.

Referring to FIG. 15, a mobile system 900 includes an application processor 910, a memory device 920, a connectivity module 930, a nonvolatile storage 940, a user interface 950, and/or a power supply 960.

In some example embodiments, the mobile system 900 may be a mobile phone, a smart phone, a personal digital assistant (PDA), a portable multimedia player (PMP), a digital camera, a music player, a portable game console, a navigation system, a tablet device, a wearable smart device, etc.

The application processor 910 may execute applications, such as a web browser, a game application, a video player, etc. In some example embodiments, the application processor 910 may include a single core or multiple cores. For example, the application processor 910 may be a multi-core processor, such as a dual-core processor, a quad-core processor, a hexa-core processor, etc. In some example embodiments, the application processor 910 may include an internal cache memory or an external cache memory.

The memory device 920 may store data processed by the application processor 910, or may operate as a working memory, for example.

The application processor 910 includes a CPU 911 and a security device 913. The security device 913 may be implemented with hardware and may provide an isolated execution environment in which the security device 913 performs one or more secure operations without intervention of the CPU 911.

For example, the security device 913 may perform a secure back-up operation to encrypt secure data, including a signature-certified firmware image and/or sensitive data, to generate encrypted secure data within the isolated execution environment and without intervention of the CPU 911, to perform a hash operation on the secure data to generate a first hash value, to encrypt the first hash value to generate an encrypted first hash value, and to store the encrypted secure data and the encrypted first hash value in the nonvolatile storage 940. For example, the security device 913 may perform a secure restoring operation to decrypt the encrypted secure data and the encrypted first hash value stored in the nonvolatile storage 940 to generate decrypted secure data and a decrypted first hash value, to perform a hash operation on the decrypted secure data to generate a second hash value, and to perform an integrity verification operation on the decrypted secure data by comparing the decrypted first hash value and the second hash value to determine whether or not they match each other.

The security device 913 may employ the security device 100 described with reference to FIGS. 1 through 13, for example.

The connectivity module 930 may perform wired or wireless communication with an external device. For example, the connectivity module 930 may perform Ethernet communication, wireless local area network (WLAN) communication, near field communication (NFC), radio frequency identification (RFID) communication, mobile telecommunication, memory card communication, universal serial bus (USB) communication, etc.

The nonvolatile storage 940 may store a boot image for booting the mobile system 900 and the encrypted secure data.

The user interface 950 may include at least one input device, such as a keypad, a touch screen, etc., and at least one output device, such as a speaker, a display device, etc. The power supply 960 may supply a power supply voltage to the mobile system 900.

Aspects of the present inventive concepts may be applied to electronic devices employing a security device implemented via various hardware components, and/or a combination of hardware and software stored in storage media, for example. Some example embodiments have been characterized herein to indicate where there may be a novel division of functionality amongst various hardware components, and/or concrete technical improvements achieved by various hardware components, for example. Aspects of the problem (s) sought to be addressed and/or the solution(s) provided by various example embodiments of the inventive concepts have been characterized herein as having been created by and/or specific to computer technology (with no applicable pre-computer analog).

Various operations of methods described above may be performed by any suitable devices capable of performing the operations, such as various hardware and/or software component(s), circuits, and/or module(s). The software may comprise an ordered listing of executable instructions for implementing logical functions, and can be embodied in any processor-readable medium for use by or in connection with an instruction execution system, apparatus, or device, such as a single or multiple-core processor or processor-containing system. The blocks or steps of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium.

For example, when a hardware device is a computer processing device (e.g., one or more processors, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible and/or non-transitory computer-readable storage media as discussed herein.

Storage media may also include one or more storage devices at units and/or devices according to some example embodiments. For example, the one or more storage devices (in which one or more software modules may reside) may be tangible and/or non-transitory computer-readable storage media, such as a random access memory (RAM), a flash memory, a read only memory (ROM), an Electrically Programmable ROM (EPROM), an Electrically Erasable Programmable ROM (EEPROM), registers, a hard disk, a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a removable disk, a Blu-ray/DVD/CD-ROM drive, a memory card, and/or other like computer-readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of some example embodiments, or they may be known devices that are altered and/or modified for the purposes of some example embodiments.

The foregoing description is illustrative of some example embodiments and is not to be construed as limiting thereof. Some example embodiments may have been described with reference to acts and symbolic representations of operations (e.g., in the form of flow charts, flow diagrams, data flow diagrams, structure diagrams, block diagrams, etc.) that may be implemented in conjunction with components and/or devices discussed in more detail above. Although some example embodiments have been described, those skilled in the art will readily appreciate that many modifications are possible in these example embodiments without materially departing from the novel teachings and advantages of the present inventive concepts. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order. Accordingly, all such modifications are intended to be included within the scope of the present inventive concepts as defined in the claims.

What is claimed is:

1. A security device included in an electronic device, the security device comprising:
    a secure processor configured to provide an isolated execution environment with which a central processing unit (CPU) of the electronic device does not intervene;
    a mail box configured to transfer a request received from the CPU to the secure processor;
    a cryptographic block coupled to the secure processor through an internal bus, the cryptographic block being configured to perform one or more secure operations including a signature certification operation on secure data, an encryption/decryption operation on the secure data, and an integrity verification operation on the secure data, within the isolated execution environment, the cryptographic block including,
        a direct memory access (DMA) circuit configured to control data access to an external storage;
    a secure DMA circuit coupled to the internal bus, the secure DMA circuit being configured to control the one or more secure operations within the isolated execution environment, wherein only the secure processor is configured to control the secure DMA circuit;
    an internal memory coupled to the internal bus, the internal memory being configured to store the secure data on which the one or more secure operations are performed; and
    a switching circuit including a plurality of switches, the switching circuit being configured to connect the internal memory, the cryptographic block, and a memory interface to each other in response to receiving a switching control signal from the secure processor, the memory interface connected to the external storage,
    wherein the DMA circuit is configured to store encrypted secure data and an encrypted first hash value in a memory region corresponding to consecutive addresses of a memory device in the external storage in response to receiving a start address from the secure processor.

2. The security device of claim 1, wherein:
    the secure processor is configured to control the cryptographic block to perform the signature certification operation on a firmware image in response to receiving a first request from the CPU, the first request designating the signature certification operation,
    the cryptographic block is configured to perform the signature certification operation on the firmware image,
    the secure DMA circuit is configured to store, in the internal memory, the firmware image on which the signature certification operation is performed, as the secure data, and
    the firmware image is received from an external source.

3. The security device of claim 2, wherein the cryptographic block is configured to generate a hash value based on the firmware image, and to perform the signature certification operation using the hash value and a signature which is received from the external source and is associated with the firmware image.

4. The security device of claim 2, wherein:
    the secure processor is configured to control the secure DMA circuit, the cryptographic block, and the DMA circuit, to perform a secure back-up operation in response to receiving a second request from the CPU, including,
        controlling the secure DMA circuit to provide the secure data stored in the internal memory to the cryptographic block,
        controlling the cryptographic block to perform an encryption operation on the secure data received from the secure DMA circuit to generate the encrypted secure data, to perform a hash operation on the secure data to generate a first hash value, to perform an encryption operation on the first hash value to generate the encrypted first hash value, and to provide the encrypted secure data and the encrypted first hash value to the DMA circuit, and controlling the DMA circuit to store the encrypted secure data and the encrypted first hash value in a memory device in the external storage, and the second request designates the secure back-up operation.

5. The security device of claim 4, wherein the cryptographic block is configured to perform the encryption operation on the secure data and the hash operation on the secure data in parallel.

6. The security device of claim 4, wherein:
the cryptographic block is configured to perform the encryption operation on the secure data using a hardware unique key of the electronic device, and to perform the hash operation on the secure data using one of a plurality of hash algorithms based on hash type information received from the secure processor, and
the cryptographic block is configured to receive the hardware unique key of the electronic device from an unclonable storage device.

7. The security device of claim 4, wherein:
the secure processor is configured to control the DMA circuit, the cryptographic block, and the secure DMA circuit to perform a secure restoring operation in response to receiving a third request from the CPU, including,
controlling the DMA circuit to provide the encrypted secure data and the encrypted first hash value, which are stored in the memory device in the external storage, to the cryptographic block,
controlling the cryptographic block to perform a decryption operation on the encrypted secure data and the encrypted first hash value to generate decrypted secure data and a decrypted first hash value,
controlling the DMA circuit to provide the decrypted secure data and the decrypted first hash value to the secure DMA circuit, and
controlling the secure DMA circuit to store the decrypted secure data and the decrypted first hash value in the internal memory, and
the third request designates the secure restoring operation.

8. The security device of claim 7, wherein the secure processor is configured to control the cryptographic block to perform a hash operation on the decrypted secure data to generate a second hash value.

9. The security device of claim 8, wherein the secure processor is configured to perform an integrity verification operation on the decrypted secure data by comparing the decrypted first hash value and the second hash value.

10. The security device of claim 8, wherein:
the cryptographic block is configured to perform the decryption operation on the encrypted secure data and the encrypted first hash value using a hardware unique key of the electronic device, and to perform the hash operation on the decrypted secure data using one of a plurality of hash algorithms based on hash type information received from the secure processor, and
the cryptographic block is configured to receive the hardware unique key of the electronic device from an unclonable storage device.

11. The security device of claim 1, wherein:
the cryptographic block further comprises:
a public key accelerator configured to perform the signature certification operation;
a block cipher engine configured to perform the encryption/decryption operation; and a hash engine configured to perform a hash operation associated with the integrity verification operation; and
the DMA circuit includes the memory interface and the switching circuit.

12. The security device of claim 11, wherein:
the secure processor is configured to provide a first switching control signal to the switching circuit in response to receiving a first request from the CPU,
the switching circuit is configured to provide the internal memory with a signature-certified firmware image, as the secure data, in response to receiving the first switching control signal from the secure processor, and
the first request designates a secure booting operation.

13. The security device of claim 12, wherein:
the secure processor is configured to provide a second switching control signal to the switching circuit in response to receiving a second request from the CPU,
the switching circuit is configured to transfer the signature-certified firmware image, stored in the internal memory as the secure data, to the block cipher engine and to the hash engine, to transfer a first hash value output from the hash engine to the block cipher engine, and to transfer, to the memory interface, encrypted secure data and an encrypted first hash value output from the block cipher engine, in response to receiving the second switching control signal from the secure processor, and
the second request designates a secure back-up operation.

14. The security device of claim 13, wherein:
the secure processor is configured to provide a third switching control signal to the switching circuit in response to receiving a third request from the CPU,
the switching circuit is configured to receive the encrypted secure data and the encrypted first hash value stored in the external storage, from the memory interface, to transfer the encrypted secure data and the encrypted first hash value to the block cipher engine, to transfer, to the internal memory, decrypted secure data and a decrypted first hash value output from the block cipher engine, and to transfer the decrypted secure data to the hash engine, in response to receiving the third switching control signal from the secure processor, and
the third request designates a secure restoring operation.

15. The security device of claim 14, further comprising:
an unclonable storage device configured to store a hardware unique key of the electronic device, and to provide the hardware unique key to the block cipher engine,
wherein the block cipher engine is configured to perform the encryption/decryption operation using the hardware unique key received from the unclonable storage device.

16. The security device of claim 1, further comprising:
a buffer memory connected to the security device through a system bus, the buffer memory being configured to store an encrypted secure code received from an external source,
wherein, in response to a size of the encrypted secure code being greater than a size of available storage space of the internal memory,
the DMA circuit is configured to sequentially provide a plurality of encrypted segments to the cryptographic block, the encrypted secure code being divided into the plurality of encrypted segments, and
the cryptographic block is configured to perform a data swap operation to sequentially perform a decryption operation on each of the plurality of encrypted segments to generate a plurality of decrypted segments, and to sequentially store each of the plurality of decrypted segments in the available storage space of the internal memory through the secure DMA circuit.

17. An electronic device comprising:
a central processing unit (CPU);
a security device configured to receive a request from the CPU and to execute the request within an isolated execution environment with which the CPU does not intervene; and
an external storage connected to the security device,
wherein the security device comprises:
  a secure processor configured to provide the isolated execution environment;
  a mail box configured to transfer the request received from the CPU to the secure processor;
  a cryptographic block coupled to the secure processor through an internal bus, the cryptographic block being configured to perform one or more secure operations including a signature certification operation on secure data, an encryption/decryption operation on the secure data, and an integrity verification operation on the secure data, within the isolated execution environment,
  the cryptographic block including a direct memory access (DMA) circuit configured to control data access to the external storage;
  a secure DMA circuit coupled to the internal bus, the secure DMA circuit being configured to control the one or more secure operations within the isolated execution environment, wherein only the secure processor is configured to control the secure DMA circuit;
  an internal memory coupled to the internal bus, the internal memory being configured to store the secure data on which the one or more secure operations are performed; and
  a switching circuit including a plurality of switches, the switching circuit being configured to connect the internal memory, the cryptographic block, and a memory interface to each other in response to receiving a switching control signal from the secure processor, the memory interface connected to the external storage,
wherein the DMA circuit is configured to store encrypted secure data and an encrypted first hash value in a memory region corresponding to consecutive addresses of a memory device in the external storage in response to receiving a start address from the secure processor.

18. The electronic device of claim 17, wherein:
the security device is configured to, in response to receiving a request to perform a secure back-up operation from the CPU, perform an encryption operation on the secure data stored in the internal memory to generate the encrypted secure data, perform a hash operation on the secure data to generate a first hash value, perform an encryption operation on the first hash value to generate the encrypted first hash value, and store the encrypted secure data and the encrypted first hash value in the external storage, without intervention of the CPU, and
the security device is configured to, in response to receiving a request to perform a secure restoring operation from the CPU, perform a decryption operation on the encrypted secure data and the encrypted first hash value stored in the external storage to generate decrypted secure data and a decrypted first hash value, store the decrypted secure data and the decrypted first hash value in the internal memory, perform a hash operation on the decrypted secure data to generate a second hash value, and perform the integrity verification operation by comparing the decrypted first hash value and the second hash value, without intervention of the CPU, and
the external storage is a nonvolatile storage.

19. A method of operating an electronic device, the electronic device including a central processing unit (CPU) and a security device, to receive a request from the CPU and to execute the request within an isolated execution environment with which the CPU does not intervene, the method comprising:
powering-on the electronic device;
performing, in a cryptographic block of the security device, a signature certification operation on a firmware image to store secure data in an internal memory of the security device;
determining whether the electronic device enters into a low power mode;
performing, in the cryptographic block in response to determining that the electronic device is entering into the low power mode, a secure back-up operation to encrypt the secure data using a hardware unique key of the electronic device to generate encrypted secure data, and to store the encrypted secure data in an external storage connected to the security device, without intervention of the CPU; and
performing, in the cryptographic block in response to receiving a wake-up request from the CPU, a secure restoring operation to decrypt the encrypted secure data stored in the external storage using the hardware unique key to generate decrypted secure data, and to store the decrypted secure data in the internal memory, without an intervention of the CPU, wherein
the storing the encrypted secure data in the external storage and the storing the decrypted secure data in the internal memory includes,
controlling a switching circuit including a plurality of switches, the switching circuit being configured to connect the internal memory, the cryptographic block, and a memory interface to each other in response, using a switching control signal from the security device, the memory interface connected to the external storage; and
storing the encrypted secure data and an encrypted first hash value in a memory region corresponding to consecutive addresses of a memory device in the external storage in response to receiving a start address from the security device.

* * * * *